US011922338B2

(12) United States Patent
Akrimi et al.

(10) Patent No.: US 11,922,338 B2
(45) Date of Patent: Mar. 5, 2024

(54) DEVICES, SYSTEMS AND METHODS FOR PROVIDING ANCILLARY OBJECTS FROM A CACHE AND CATEGORIZED PROVIDER OBJECTS

(71) Applicant: AMADEUS S.A.S., Biot (FR)

(72) Inventors: Fadi Akrimi, Biot (FR); Olivier Amadieu, Biot (FR); Lorenzo Baldacchini, Biot (FR); Modou Mamoune Diene, Biot (FR); Louis Harnay, Biot (FR); Krishna Padmanabhan, Biot (FR); Jerome Vernet, Biot (FR); Thibaut Giacomel, Biot (FR); Nikita Nanda, Biot (FR); Julien Renaud Starozinski, Biot (FR)

(73) Assignee: AMADEUS S.A.S., Biot (FR)

( * ) Notice: Subject to any disclaimer, the term of this patent is extended or adjusted under 35 U.S.C. 154(b) by 707 days.

(21) Appl. No.: 16/708,852

(22) Filed: Dec. 10, 2019

(65) Prior Publication Data

US 2021/0174266 A1 Jun. 10, 2021

(51) Int. Cl.
*G06Q 10/02* (2012.01)
*G06F 16/2453* (2019.01)
(Continued)

(52) U.S. Cl.
CPC ....... *G06Q 10/02* (2013.01); *G06F 16/24539* (2019.01); *G06F 16/285* (2019.01); *G06Q 50/14* (2013.01); *H04L 67/568* (2022.05)

(58) Field of Classification Search
CPC .. G06Q 10/02; G06Q 50/14; G06F 16/24539; G06F 16/285; H04L 67/568
See application file for complete search history.

(56) References Cited

U.S. PATENT DOCUMENTS 6,360,205 B1 * 3/2002 Iyengar ................ G06Q 50/188 705/5
10,402,754 B1 * 9/2019 Walsh ..................... H04L 67/10
(Continued)

FOREIGN PATENT DOCUMENTS

AU 2011336865 B2 * 11/2016 ............. G06Q 10/02
CA 3107811 A1 * 11/2019 ............ G06F 16/90
(Continued)

OTHER PUBLICATIONS

Shukla et al. (Dynamic Pricing for Airline Ancillaries with Customer Context), 2019, Cornell University, 1-9 (Year: 2019).*
(Continued)

*Primary Examiner* — Crystol Stewart
(74) *Attorney, Agent, or Firm* — PERRY + CURRIER, INC.

(57) ABSTRACT

A device, system and method for providing ancillary objects from a cache and/or for providing categorized provider objects is provided. One or more servers receive a flight object representing a flight and search an ancillary object cache for predetermined ancillary objects associated with previous flights similar to the flight. When one or more of the predetermined ancillary objects, associated with at least one previous flight similar to the flight, are found at the ancillary object cache, a requesting device is provided with a response corresponding to the flight object and the one or more of the predetermined ancillary objects associated with the at least one previous flight similar to the flight. The flight objects and the ancillary objects may be assembled into provider objects which are provided to the requesting device. The provider objects may be categorized based on provider object categorization criteria associated with the requesting device.

15 Claims, 15 Drawing Sheets

(51) Int. Cl.

| | |
|---|---|
| ***G06F 16/28*** | (2019.01) |
| ***G06Q 50/14*** | (2012.01) |
| ***H04L 67/568*** | (2022.01) |

(56) References Cited

U.S. PATENT DOCUMENTS

| | | | | |
|---|---|---|---|---|
| 2006/0149713 | A1 | 7/2006 | Walker | |
| 2007/0094056 | A1* | 4/2007 | Kang | G06Q 50/14 705/5 |
| 2013/0073323 | A1* | 3/2013 | Zacharia | G06Q 10/025 705/5 |
| 2016/0260182 | A1* | 9/2016 | Garman | G06Q 10/02 |
| 2016/0307281 | A1* | 10/2016 | Canis | G06Q 10/025 |
| 2016/0378874 | A1* | 12/2016 | Jafri | G06Q 10/02 707/706 |
| 2017/0031931 | A1* | 2/2017 | Linda | G06F 16/906 |
| 2018/0182017 | A1* | 6/2018 | O'Neil-Dunne | G06F 16/2455 |
| 2018/0268325 | A1* | 9/2018 | Kim | G06Q 10/02 |
| 2019/0213554 | A1* | 7/2019 | Chen | G06Q 30/016 |
| 2020/0394728 | A1* | 12/2020 | Fishberg | G06Q 30/0627 |
| 2021/0142232 | A1* | 5/2021 | Handler | G06Q 30/0205 |

FOREIGN PATENT DOCUMENTS

| | | | | |
|---|---|---|---|---|
| EP | 3373213 | A1 * | 9/2018 | G06Q 10/02 |
| WO | WO-2004109558 | A1 * | 12/2004 | G06F 16/24539 |
| WO | WO-2021115778 | A1 * | 6/2021 | G06F 16/24539 |

OTHER PUBLICATIONS

Uzun-Per et al. (An Approach to Recommendation Systems Using Scalable Association Mining Algorithms on Big Data Processing Platforms), 2021 International Conference on INnovations in Intelligent Systems and Applications (INISTA), 2021, pp. 1-6, doi:10.1109/INISTA52262.2021.9548413. (Year: 2021).*

Xiaohu Chen, Qilin Fan and Hao Yin, "Caching in Information-Centric Networking: From a content delivery path perspective," 2013 9th International Conference on Innovations in Information Technology (IIT), Abu Dhabi, 2013, pp. 48-53, doi: 10.1109/Innovations.2013.6544392. (Year: 2013).*

Degenaro, Louis, et al. "A Middleware System Which Intelligently Caches Query Results." Lecture Notes in Computer Science 1795 (2000): pp. 24-44.

Anonymous "NDC in a Nutshell." Jan. 1, 2014, pp. 1-10, URL: https://www.cybage.com/sites/default/files/whitepaper/2019-05/White-Paper-NDC-Dec29.pdf.

Schaal, Hanna, "Putting NDC into Practice: 1-7 Reference Architecture and Technology Providers", Oct. 15, 2015, pp. 1-6, Retrieved from the Internet: URL: https://www.prologis.aero/wp-content/uploads/2013/09/Putting-NDC-into-Practice.pdf.

* cited by examiner

1351

| Airline | Base Offer | First Upsell Offer | Second Upsell Offer |
|---|---|---|---|
| AL1 | FF=Basic<br>No Carryon<br>No Checked Bags<br>No Premium Seat<br>Non-Refundable | FF=Good<br>One Carryon<br>One Checked Bag<br>No Premium Seat<br>Change Flight For Fee | FF=Maxi<br>One Carryon<br>One Checked Bag<br>Premium Seat<br>Completely Refundable |
| AL2 | FF=Standard<br>No Carryon<br>No Checked Bags<br>Premium Seat<br>Non-Refundable | N/A | N/A |
| AL3 | FF=Super Eco<br>No Carryon<br>One Checked Bag<br>No Premium Seat<br>Non-Refundable | FF=Eco<br>No Carryon<br>No Checked Bag<br>Premium Seat<br>Non-Refundable | FF=Eco Plus<br>One Carryon<br>One Checked Bag No<br>Premium Seat<br>Non- Refundable |

1424

| Criteria 224-1 | Criteria 224-2 | Criteria 224-3 |
|---|---|---|
| No Carryon<br>No Checked Bags<br>No Premium Seat<br>Non-Refundable | One Carryon<br>No Checked Bag<br>No Premium Seat<br>Change Flight For Fee | One Carryon<br>One Checked Bag<br>Premium Seat<br>Completely Refundable |
| AL1-FF Basic | AL3-FF Super Eco | AL1-FF Maxi |
| AL2-FF Standard | AL1-FF Basic+One Ancillary Object From Cache 124 | AL3-Eco Plus |
| AL3-FF Super Eco | | AL2-FF Standard + Two Ancillary Objects From Cache 124 |

DEVICES, SYSTEMS AND METHODS FOR PROVIDING ANCILLARY OBJECTS FROM A CACHE AND CATEGORIZED PROVIDER OBJECTS

FIELD

The specification relates generally to databases, and specifically to a device, system and method for providing ancillary objects from a cache and providing categorized provider objects.

BACKGROUND

The provision of various products, including for example travel-related goods and services (e.g. flights, hotel reservations, and the like) typically requires various discrete entities to exchange data defining various aspects of the products. Examples of such entities, in the context of travel-related products, include airlines, travel agencies, end users, reservation systems, and the like. Although such entities may be configured to exchange data according to a standardized format (e.g. according to the eXtensible Markup Language (XML)-based New Distribution Capability (NDC) standard in the context of travel-related products), they may nonetheless employ different mechanisms to initiate the exchange of data.

SUMMARY

An aspect of the present specification provides a server comprising: a communication interface; and a controller configured to: receive, via the communication interface, a flight object representing a flight provided by one or more provider systems; search an ancillary object cache for predetermined ancillary objects associated with previous flights similar to the flight; and when one or more of the predetermined ancillary objects, associated with at least one previous flight similar to the flight, are found at the ancillary object cache, provide, via the communication interface, to a requesting device, a response corresponding to the flight object and the one or more of the predetermined ancillary objects associated with the at least one previous flight similar to the flight.

Another aspect of the present specification provides a method comprising: receiving, at one or more servers, a flight object representing a flight provided by one or more provider systems; searching, at the one or more servers, an ancillary object cache for predetermined ancillary objects associated with previous flights similar to the flight; and when one or more of the predetermined ancillary objects, associated with at least one previous flight similar to the flight, are found at the ancillary object cache, providing, via the one or more servers, to a requesting device, a response corresponding to the flight object and the one or more of the predetermined ancillary objects associated with the at least one previous flight similar to the flight.

Another aspect of the present specification provides a non-transitory computer-readable medium storing a computer program, wherein execution of the computer program is for: receiving, at one or more servers, a flight object representing a flight provided by one or more provider systems; searching, at the one or more servers, an ancillary object cache for predetermined ancillary objects associated with previous flights similar to the flight; and when one or more of the predetermined ancillary objects, associated with at least one previous flight similar to the flight, are found at the ancillary object cache, providing, via the one or more servers, to a requesting device, a response corresponding to the flight object and the one or more of the predetermined ancillary objects associated with the at least one previous flight similar to the flight.

Yet a further aspect of the present specification provides a server comprising: a communication interface; and a controller configured to: receive, via a communication interface, from a requesting device, a request for one or more provider objects provided by one or more provider systems; search for the provider objects at one or more of the provider systems, a flight object cache and an ancillary object cache; receive the one or more provider objects; categorize the provider objects based on provider object categorization criteria associated with the requesting device; and provide, via the communication interface, to the requesting device, a response corresponding to the provider objects as categorized.

Another aspect of the present specification provides a method comprising: receiving, at one or more servers, from a requesting device, a request for one or more provider objects provided by one or more provider systems; searching, at the one or more servers, for the provider objects at one or more of the provider systems, a flight object cache and an ancillary object cache; receiving, at the one or more servers, the one or more provider objects; categorizing, at the one or more servers, the provider objects based on provider object categorization criteria associated with the requesting device; and providing, at the one or more servers, to the requesting device, a response corresponding to the provider objects as categorized.

Another aspect of the present specification provides a non-transitory computer-readable medium storing a computer program, wherein execution of the computer program is for: receiving, at one or more servers, from a requesting device, a request for one or more provider objects provided by one or more provider systems; searching, at the one or more servers, for the provider objects at one or more of the provider systems, a flight object cache and an ancillary object cache; receiving, at the one or more servers, the one or more provider objects; categorizing, at the one or more servers, the provider objects based on provider object categorization criteria associated with the requesting device; and providing, at the one or more servers, to the requesting device, a response corresponding to the provider objects as categorized.

BRIEF DESCRIPTIONS OF THE DRAWINGS

For a better understanding of the various examples described herein and to show more clearly how they may be carried into effect, reference will now be made, by way of example only, to the accompanying drawings in which:

FIG. 14 depicts examples of provider objects and the provider object categorization criteria, according to non-limiting examples.

DETAILED DESCRIPTION

Figure 1:
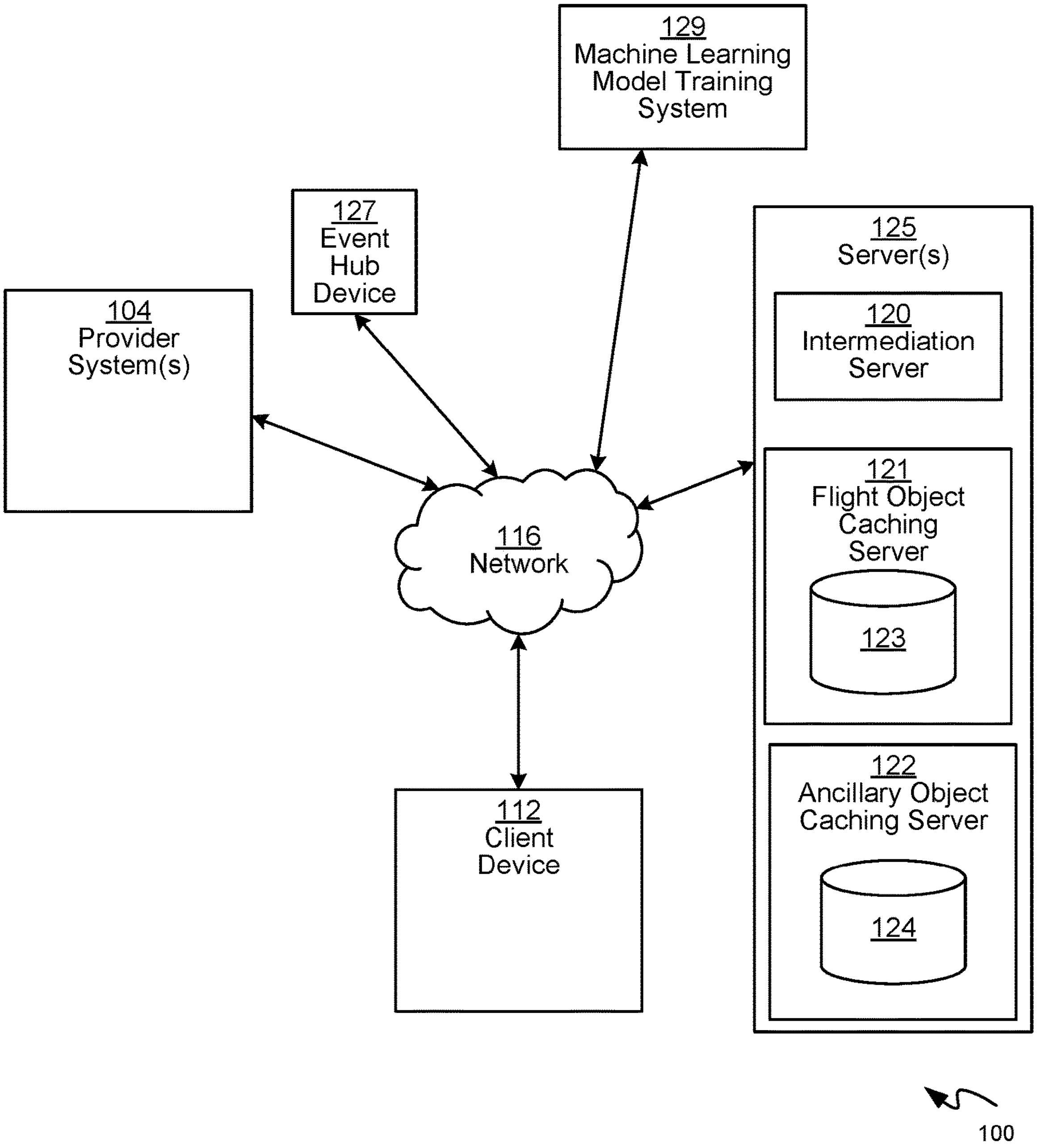
FIG. 1 depicts a system for providing ancillary objects from a cache and/or for providing categorized provider objects, according to non-limiting examples.

FIG. 1 depicts a system 100 for providing ancillary objects from a cache and/or providing categorized provider objects. The provider objects, in the examples discussed herein, may comprise data objects and/or data records which correspond to products and/or items, such as travel-related goods and services (e.g. flights, hotel reservations, car rentals and the like), provided by a provider system. More specifically, flight objects (e.g. flight provider objects) may correspond to products and/or items, discussed in the examples, below may be flight tickets, and the like, and ancillary objects (e.g. ancillary provider objects) may be products and/or items related to services for flight tickets (e.g. baggage check services, in-flight food, entertainment, pet-related services, and the like).

Herein, the terms flight object and flight provider object are used interchangeably. Similarly, the terms ancillary object and ancillary provider object are used interchangeably. In other words, the term flight provider object may be substituted for the term flight object throughout, and vice versa; and, similarly, the term ancillary provider object may be substituted for the term ancillary object throughout, and vice versa.

Delivery of the items mentioned above is typically controlled by a provider entity, such as an airline in the case of the items discussed in connection with the examples provided herein. The system 100 includes one or more provider systems 104 (e.g. one or more servers or other suitable computing devices), which in this example is operated by one or more provider entities. The system 100 can include a plurality of provider systems 104, each operated by respective provider entities (e.g. various airlines), although only one provider system 104 is shown for illustrative purposes. The provider objects may be in any suitable format including, but not limited to Edifact recommendations in the context of Global Distribution System (GDS)-based data exchange, offer records in the context of New Distribution Capability (NDC)-based data exchange, and/or any other suitable format. Indeed, the provider objects may comprise data objects and/or data records, for example storing an Edifact recommendation or an NDC offer, and/or any other suitable data representing at least one item provided by the provider system 104. In particular, however, flight objects may comprise Edifact recommendations and/or NDC offers representing flight tickets, and ancillary objects may comprise NDC offers representing related services.

Regardless of format, each provider object defines an item, or a combination of items, which may be offered for purchase (e.g. by end users of the items) including, but not limited to one or more of flights, train rides, hotel stays, airport lounge access, seat upgrades, baggage check services, in-flight food, entertainment, pet-related services, and the like.

In the examples discussed below, flight objects may define flights operated by the provider entity, and ancillary objects may define ancillary services associated with the flights. Each provider object therefore contains various fields. Certain fields define item attributes, such as product object identifiers (e.g. service identifiers, item identifiers, product identifiers and the like), locations, dates and times corresponding to the products (e.g. flight times and other itinerary data). The type of fields and/or data of a provider object may depend on a type of a provider object. For example, flight objects corresponding to flights may include flight identifiers, whereas ancillary objects corresponding to other travel-related items, such as an offer for a train ride, a hotel, accessing an airport lounge a premium seat upgrade, pet-related services (e.g. for travelling with a pet), and the like, may include information related to the train ride, the hotel, the lounge, the premium seat, the pet-related services etc.

As will be described below, the system 100 further comprises a network 116 and an intermediation server 120. The network 116 comprises any suitable combination of local and wide area networks, including the Internet, such that the components of the system 100 may communicate. The intermediation server 120 generally intermediates between the client device 112 and the provider system 104, for example such that the client device 112 may request products from the provider system 104, and/or more than one provider system 104, via the intermediation server 120.

In general, requesting and/or ordering items represented by provider objects occur in the system 100 via exchange of messages, for example between the intermediation server 120 and the provider system 104. Such messages may hence be associated with provider objects, and may include messages for one or more of: requesting provider objects; requesting further information associated with provider objects; providing provider objects; ordering and/or purchasing items represented by provider objects, and the like. Indeed, requests for provider objects may include shopping requests and pricing requests. Shopping requests may be for estimates of prices, for example when an operator of the client device 112 and/or another requesting device, is shopping for flights and/or ancillary services, but has not yet decided to purchase a flight and/or ancillary services. Pricing requests may be to request a final price for a flight and/or ancillary services prior to actual purchase of the flight and/or ancillary services. In some examples, ancillary services can be shopped, priced and/or booked after flight purchase. Billions of shopping requests may be generated world-wide on a daily basis, while a smaller number of pricing requests are generated.

As depicted, the system 100 further comprises a flight object caching server 121, which caches and/or stores flight objects received from various sources in the system 100 including, but not limited to, the provider system 104. As will be explained below, the flight object caching server 121 further provides responses that include flight objects stored at a cache to a requesting device, such as the client device 112, for example via the intermediation server 120.

Similarly, as depicted, the system 100 further comprises an ancillary object caching server 122, which caches and/or stores ancillary objects received from various sources in the system 100 including, but not limited to, the provider system 104. As will be explained below, the ancillary object caching server 122 further provides responses that include ancillary objects stored at a cache to a requesting device, such as the client device 112, for example via the intermediation server 120. As described below, the ancillary objects may be provided in conjunction with flight objects.

As depicted, the flight object caching server 121 maintains a flight object cache 123, which may be implemented as one or more memories. The flight object cache 123 contains flight objects as received at the flight object caching server 121 from various sources of provider objects in the system 100. The flight object caching server 121 may implement machine learning models to categorize flight objects by one or more of reusability and context characteristics, and store the flight objects at the flight object cache 123 as categorized; the flight object caching server 121 may further determine whether a stored and categorized flight object is currently valid.

Similarly, as depicted, the ancillary object caching server 122 maintains an ancillary object cache 124, which may be implemented as one or more memories. The ancillary object cache 124 contains ancillary objects as received at the ancillary object caching server 122 from various sources of provider objects in the system 100 including, but not limited to, receiving service lists from provider systems 104 when ancillary services are booked (e.g. which may be independent of flight bookings and/or purchases). For example, a service list may be a list of available ancillary services offered by a provider system 104, with associated prices. The ancillary object caching server 122 may implement machine learning models to categorize ancillary objects by one or more of type and previous flight associations, and store the ancillary objects at the ancillary object cache 124 as categorized; the ancillary object caching server 122 may further determine whether a stored and categorized ancillary object is currently valid.

Furthermore categorization functionality of the caching servers 121, 122 is described in Applicant's co-pending application titled "DEVICE, SYSTEM AND METHOD FOR PROVIDING PROVIDER OBJECTS FROM A CACHE", having U.S. patent application Ser. No. 16/656,799, filed Oct. 18, 2019 and incorporated herein by reference.

While the servers 120, 121, 122 may be three separate devices, the functionality of the servers 120, 121, 122 may be combined into one or more servers 125 and/or implemented in a cloud computing environment using a plurality of servers and/or one or more servers. In some examples, the caching servers 121, 122 may be combined into one caching server, with a common cache, with respective flight objects and ancillary objects categorized accordingly.

The client device 112, in the present example, may be operated by a travel agent entity, and therefore generates and transmits requests for provider objects (e.g. representing products which may be for purchase), to the provider system 104, via the intermediation server 120, on behalf of end users (e.g. travelers). However, the client device 112 may be a computing device of a consumer using an on-line service to search for flights. The system 100 can include a plurality of client devices 112, although only one client device 112 is shown in FIG. 1 for illustrative purposes. Put another way, the intermediation server 120 intermediates between the client device 112 and the provider system 104 and receives requests from the client device 112.

The client device 112 may be used, for example, by an operator thereof to search for flights (e.g. flight objects) and ancillary services (e.g. ancillary objects) for clients. While not depicted, the client device 112 may have access to client and/or traveler profiles and/or files which may define travel preferences for clients and/or store a travel history (e.g. previous flights and/or ancillary services) of clients. For example, the client and/or traveler profiles and/or files may indicate whether a given client prefers to carry on bags and/or check bags, and/or how many bags are preferred in each case, and/or whether or not the given client has previously travelled with a pet, such as a cat, a dog, and the like. However, such client and/or traveler profiles and/or files may define and/or store any suitable travel preferences and/or travel history of clients.

The client device 112 may hence initiate a search for flights (e.g. flight objects) and ancillary services (e.g. ancillary objects) by transmitting a request for flight objects and ancillary objects to the intermediation server 120, the request defining criteria for searching for a flight, for example, a time period for a flight, an origin and destination for a flight, and any ancillary services to be requested with the flight (e.g. a number of checked bags, travelling with a pet, and the like).

The intermediation server 120 may receive the request and search for flight objects that meet the criteria of the request at the flight object caching server 121 and/or the provider systems 104.

Put another way, the intermediation server 120 may: receive, from a requesting device (e.g. the client device 112), a request for a flight object; search, based on criteria of the request, at least one of the flight object cache 123 and the one or more provider systems 104 for a flight object representing a flight provided by one or more provider systems 104; and receive, from at least one of the flight object cache 123 and the one or more provider systems 104, the flight object.

Regardless of source, the intermediation server 120 generally receives a flight object representing a flight provided by one or more provider systems 104, the flight corresponding to criteria of the request.

Similarly, the intermediation server 120 may request ancillary objects from the ancillary object caching server 122 which determines whether an ancillary object/or a predetermined ancillary object, stored at the ancillary object cache 124, is associated with at least one previous flight similar to the flight that is represented by the flight object received at the intermediation server 120. For example a previous flight may be similar to the flight represented by the flight object received at the intermediation server 120 when the previous flight is one or more of: between a same origin and destination as the flight; provided by a same provider system and/or airline as the flight; in a same time period as the flight (e.g. a same period of the day, a same time of year, and the like); has a same flight number as the flight; has a same and/or a similar load as the flight; and the like. Indeed, determining whether a previous flight is similar to the flight represented by the flight object received at the intermediation server 120 may be machine learning based, as described in more detail below.

In some examples, a previous flight may be the same as the flight that is represented by the flight object received at the intermediation server 120. For example, previously, ancillary objects for the ancillary services for the flight, that is represented by the flight object received at the intermediation server 120, may have been received and stored at the ancillary object cache 124, for example when the client device 112, and/or another client device, was used to search for and/or book the flight previously. Hence, the term "an ancillary object/or a predetermined ancillary object, stored at the ancillary object cache 124, associated with at least one previous flight similar to the flight" may also be understood to mean "an ancillary object/or a predetermined ancillary object previously stored at the ancillary object cache 124 in association with a previously searched and/or previously booked flight related to and/or associated with the flight".

In some examples, when the intermediation server 120 receives, from a requesting device, a request for a flight object that includes criteria for searching for flights, the intermediation server 120 may optimize a response time for responding to the request, by: prior to receiving a flight object representing a flight that meets the criteria of the request, determine whether an ancillary object/or predetermined ancillary object, stored at the ancillary object cache 124, is associated with at least one previous flight associated with the criteria of the request. In some of these examples, any ancillary objects/or a predetermined ancillary objects found in response to such a search may be temporarily stored and/or cached at the intermediation server 120 (e.g. at a memory thereof). Thereafter, when the intermediation server 120 receives the flight object representing a flight that meets the criteria of the request, the intermediation server 120 may determine whether an ancillary object/or a predetermined ancillary object, stored at the ancillary object cache 124, is associated with at least one previous flight similar to the flight that is represented by the flight object received at the intermediation server 120, using the ancillary objects/or a predetermined ancillary objects found in the initial search. In other words, a search for a flight object and a search for an ancillary object, as described herein, may occur in any suitable order.

Furthermore, when an ancillary object stored at the ancillary object cache 124 is determined to be associated with at least one previous flight similar to the flight that is represented by the flight object received at the intermediation server 120, the ancillary object caching server 122 may estimate whether predetermined ancillary objects are estimated to be currently valid. When one or more predetermined ancillary objects are estimated to be currently valid, the ancillary object caching server 122 provides the one or more predetermined ancillary objects to the intermediation server 120 which transmits the one or more predetermined ancillary objects to the client device 112 with the flight object in response to the request. For example, estimation of validity may be machine learning based and may determine whether a predetermined ancillary object stored at the ancillary object caching server 122 still represents an ancillary service available from a provider system 104.

Hence, previously received, stored, and categorized ancillary objects may be used, by the intermediation server 120, to respond to the request from the client device 112, rather than requesting ancillary objects from the provider system 104. While such ancillary objects may also be directly requested from the provider system 104 (e.g. and which may be provided in the form of a service list from the provider system 104), there may be billions of requests for flight objects daily. In particular, as described above, there may be billions of shopping requests daily, which may merely be inquiries for price estimates of flight objects and/or ancillary objects, and which may not lead to purchase of a flight object and/or ancillary objects. Hence requesting such ancillary objects from the provider system 104, at least in conjunction with shopping requests, may unacceptably increase bandwidth in the network 116 and/or place undo load on servers of the provider system 104. Hence, to obviate such a bandwidth increase and/or load on servers of the provider system 104, the intermediation server 120 may communicate with the ancillary object caching server 122 and/or search the ancillary object cache 124 for predetermined ancillary objects rather than request ancillary objects from the provider system 104. Such communication may also reduce time in responding to the request as compared to requesting ancillary objects from the provider system 104.

In some examples, when one or more of the predetermined ancillary objects are not found at the ancillary object cache 124, the intermediation server 120 and/or the ancillary object caching server 122 may: request further ancillary objects from the one or more provider systems 104, the further ancillary objects associated with the flight (e.g. received at the intermediation server 120), such that a response to a requesting device (e.g. the client device 112) includes the further ancillary objects as received from the one or more provider systems 104 in place of the one or more of the predetermined ancillary objects; and store the further ancillary objects, as received from the one or more provider systems 104, at the ancillary object cache 124 as further predetermined ancillary objects.

However, such an example may introduce a delay into responding to the request from the client device 112 while the intermediation server 120 waits for the further ancillary objects from the one or more provider systems 104.

Hence, in other examples, when one or more of the predetermined ancillary objects are not found at the ancillary object cache 124, the intermediation server 120 and/or the ancillary object caching server 122 may: provide a response to the requesting device without an ancillary object; request further ancillary objects from the one or more provider systems 104, the further ancillary objects associated with the flight received at the intermediation server 120; and store the further ancillary objects, as received from the one or more provider systems 104, at the ancillary object cache 124 as further predetermined ancillary objects, the further ancillary objects being categorized prior to storage, as described herein.

Such examples may lead to faster responses to the requesting device, as compared to examples where further ancillary objects are requested from the one or more provider systems 104 prior to providing a response.

Indeed, each of these examples may correspond to a different mode of the intermediation server 120, and the mode of the intermediation server 120 may be selected by the requesting device, such as the client device 112, when the request for a flight object is generated. For example, the requesting device (e.g. the client device 112) may select a mode of the intermediation server 120 via the request; in particular, the request may include an indication of a mode of the intermediation server 120.

Furthermore, by requesting and storing ancillary objects from the provider systems 104, for example in association with receiving a request from the client device 112, the intermediation server 120 and/or the ancillary object caching server 122 may continue to populate the ancillary object cache 124.

As depicted, the system 100 further comprises an event hub device 127, which may receive messages associated with provider objects, from the provider system 104. The event hub device 127 may comprise a proxy for at least the intermediation server 120 such that messages received by at least the intermediation server 120 are received at the event hub device 127. For example, when the provider system 104 transmits a message and/or a response to the intermediation server 120 that includes a provider object, the message and/or the response may first be received at the event hub device 127 and then transmitted to the intermediation server 120. Put another way, when provider objects are requested from a provider system, the provider objects may be pushed to the event hub device 127 to make them accessible to other components of the system 100, other than a current instance of the intermediation server 120 (e.g. the system 100 may comprise other intermediation servers). Indeed, the event hub device 127 may be configured to receive messages and/or responses that include provider objects from all provider systems 104 of the system 100. Such "traffic" may be "live" and include messages generated due to provider objects requested by the client device 112. In some of these examples, the event hub device 127 may receive service lists from the provider systems 104, as described above.

However, in other examples, such traffic may not be "live"; in these examples, a component of the system 100, such as a traffic generator (e.g. which may also be a requesting device), which may be a component of the intermediation server 120 and/or a separate component, and the like, may automatically and/or periodically request provider objects from one or more provider systems 104 via messages, for example to have a record of offers for flights to given locations on particular days, and a record of associated ancillary services; such requests may be transmitted and/or triggered by the intermediation server 120.

The caching servers 121, 122 generally receive, from the event hub device 127 provider objects generated by the provider system 104 for storage at the caches 123, 124. For example, the event hub device 127 may push messages and/or provider objects to the caching servers 121, 122 and/or the caching servers 121, 122 may request messages and/or provider objects from the event hub device 127.

As depicted, the system 100 further comprises a machine learning model training system 129 which may receive messages from the event hub device 127, and generate machine learning classifiers for machine learning models implemented at the caching servers 121, 122 for example as described in Applicant's co-pending application titled "DEVICE, SYSTEM AND METHOD FOR TRAINING MACHINE LEARNING MODELS USING MESSAGES ASSOCIATED WITH PROVIDER OBJECTS", having U.S. patent application Ser. No. 16/656,820, filed Oct. 18, 2019 and incorporated herein by reference. The machine learning model training system 129 may generate classifiers for categorizing flight objects and ancillary objects.

As will be further described below, the intermediation server 120 may also be configured to provide categorized provider objects and in particular provider objects categorized with regards to provider object categorization criteria associated with a requesting device (e.g. the client device 112) which may be different from how provider objects are categorized at the caches 123, 124 and/or different from how provider objects are categorized by the provider systems 104. For example, when a flight object is requested from a provider system 104, the provider system 104 may provide flight objects, as well as associated ancillary objects, according to categories as determined by the provider systems 104. For example, a provider system 104 may provide a flight object according to particular fare conditions and with particular ancillary services.

However, when the client device 112 is requesting flight objects, the client device 112 may request flight objects according to categories that differ from the categories of the provider objects. For example, the client device 112 may be requesting flight objects on behalf of an entity (e.g. a business, and the like), which requires that flight objects be categorized according to their own predetermined categories which may differ from the categorizations of the provider objects. As such, the intermediation server 120 may store and/or have access to provider object categorization criteria. Such examples are described in further detail below.

Figure 2:
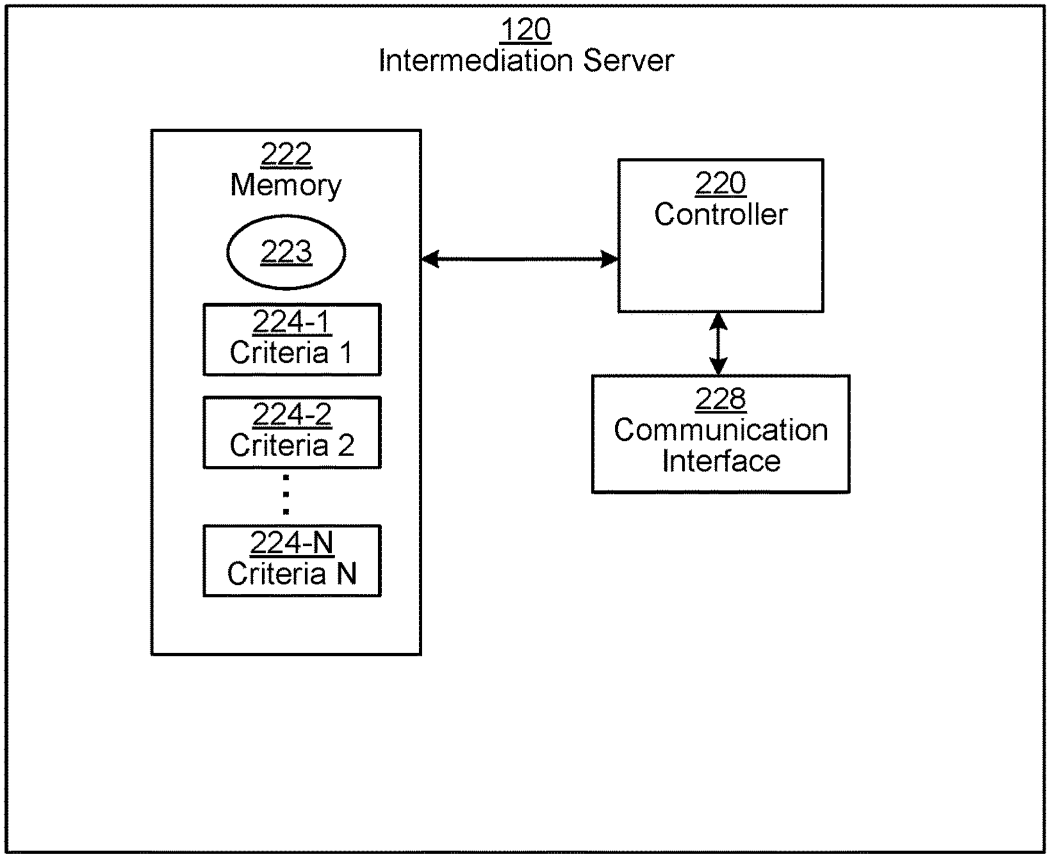
FIG. 2 depicts an example structure of one or more servers for providing ancillary objects from a cache and/or for providing categorized provider objects, according to non-limiting examples.

Before discussing the functionality of the system 100 in greater detail, certain components of the intermediation server 120 and the ancillary object caching server 122 will be discussed in greater detail with reference to FIG. 2 and FIG. 3, respectively.

While the servers 120, 121, 122 are described as stand-alone devices and/or separate from each other, in other examples, the functionality of the intermediation server 120, the flight object caching server 121 and/or the ancillary object caching server 122 may be distributed between other components of the system 100 and/or the functionality of the servers 120, 121, 122 may be at least partially combined with each other. Hence, the processing and/or memory resources depicted in FIG. 2 and FIG. 3 may be shared and/or distributed between one or more of the intermediation server 120, the flight object caching server 121 and the ancillary object caching server 122.

The intermediation server 120 will next be described with respect to FIG. 2. As shown in FIG. 2, the intermediation server 120 includes at least one controller 220, a memory 222 storing an application 223, and a communication interface 228.

The memory 222 implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The controller 220 and the memory 222 are generally comprised of one or more integrated circuits (ICs).

The controller 220 is also interconnected with the communication interface 228, which enables the intermediation server 120 to communicate with the other components of the system 100 via the network 116. The communication interface 228 therefore includes any necessary components (e.g. network interface controllers (NICs), radio units, and the like) to communicate via the network 116. The specific components of the communication interface 228 are selected based upon the nature of the network 116. The intermediation server 120 can also include input and output devices connected to the controller 220, such as keyboards, mice, displays, and the like (not shown).

The components of the intermediation server 120 mentioned above can be deployed in a single enclosure, or in a distributed format. In some examples, therefore, the intermediation server 120 includes a plurality of processors, either sharing the memory 222 and communication interface 228, or each having distinct associated memories and communication interfaces.

The memory 222 stores a plurality of computer-readable programming instructions, executable by the controller 220, in the form of various applications, including the application 223. As will be understood by those skilled in the art, the controller 220 executes the instructions of the application 223 (and any other suitable applications) in order to perform various actions defined by the instructions contained therein. In the description below, the controller 220, and more generally the intermediation server 120, are said to be configured to perform those actions. It will be understood that they are so configured via the execution (by the controller 220) of the instructions of the applications stored in memory 222.

Execution of the application 223, as will be discussed below, configure the intermediation server 120 and/or the controller 220 to: receive, via the communication interface 328, a flight object representing a flight provided by one or more provider systems 104; search the ancillary object cache 124 for predetermined ancillary objects associated with previous flights similar to the flight; and when one or more of the predetermined ancillary objects, associated with at least one previous flight similar to the flight, are found at the ancillary object cache, provide, via the communication interface 328, to a requesting device (e.g. the client device 112), a response corresponding to the flight object and the one or more of the predetermined ancillary objects associated with the at least one previous flight similar to the flight.

Hence, the intermediation server 120 and/or the controller 220 may assemble a flight object and any predetermined ancillary objects into provider objects which may be provided in the response.

As depicted, the memory 222 further stores provider object categorization criteria 224-1, 224-2 . . . 224-N. The provider object categorization criteria 224-1, 224-2 . . . 224-N are interchangeably referred to hereafter, collectively, as the provider object categorization criteria 224 and, generically, as a set of provider object categorization criteria 224 and/or provider object categorization criterion 224. While an integer number "N" of the provider object categorization criteria 224 are depicted, the memory 222 may store any suitable number of provider object categorization criteria 224. Indeed, the provider object categorization criteria 224 are generally preconfigured at the memory 222, for example by an entity associated with the client device 112 and/or a requesting device. The provider object categorization criteria 224 comprises respective prepopulated definitions of one or more of respective service levels of flights, associated fare rules, and associated services of the flights, the prepopulated definitions associated with the client device 112 and/or a requesting device and not the one or more provider systems 104.

For example, a travel agency operating a client device 112 may engage with a business who wishes to offer and/or book various categories of flight tickets to their employees, for example for business trips. Hence, in some examples, a category of flight ticket offered to an employee may depend on a position of the employee in an organizational hierarchy. For example, employees that are not part of management may only be offered economy flights with one checked bag, and no exchange and/or refund on a flight. Hence, associated provider object categorization criteria 224 may define flight tickets with one checked bag, and no exchange and/or refund on a flight.

However, employees that are part of middle management, may be offered economy plus flights, with one checked bag, and a given cost for an exchange and/or refund on a flight. Hence, associated provider object categorization criteria 224 may define flight tickets with one checked bag, and the given cost for exchange and/or refund on a flight.

Similarly, employees that are part of upper management, may be offered business class flights, with two checked bags, and another given cost for an exchange and/or refund on a flight. Hence, associated provider object categorization criteria 224 may define flight tickets with two checked bags, and the other given cost for an exchange and/or refund on a flight.

Hence, in this example, there may be three provider object categorization criteria 224 stored at the memory 222 for the business, each defining different types of flight tickets and/or fare rules and/or ancillary services which may be provided to employees depending on their position in an organizational hierarchy.

Hence, the provider object categorization criteria 224 generally provide definitions for the different categories for the business, and indeed, different businesses may have different provider object categorization criteria 224. Hence, the provider object categorization criteria 224 may be grouped by business, and the like, and a request for a provider object received at the intermediation server 120, from the client device 112 and/or a requesting device, may select a group of provider object categorization criteria 224 to use based on an identifier in the request. As such, the number "N" of the provider object categorization criteria 224 may depend on the number of categories that a business defines and/or a number of business serviced by the client device 112 and/or a requesting device. However, an entity of the client device 112 and/or a requesting device may define their own provider object categorization criteria 224 which may be offered to any clients. Indeed, the number "N" of provider object categorization criteria 224 is generally any suitable number.

Regardless, the provider systems 104 generally have their own definitions for categorizing provider objects which may or may not correspond to the provider object categorization criteria 224. Hence, the intermediation server 120 generally categorizes received provider objects according to the provider object categorization criteria 224 to attempt to provide provider objects according to the provider object categorization criteria 224. However, a provider object as received from the provider systems 104 may fit more than one category defined by the provider object categorization criteria 224.

Hence, execution of the application 223 may further configure the intermediation server 120 and/or the controller 220 to: receive, via the communication interface 228, from a requesting device (e.g. the client device 112), a request for one or more provider objects provided by one or more provider systems 104; search for the provider objects at one or more of the provider systems 104, the flight object cache 123 and the ancillary object cache 124; receive the one or more provider objects; categorize the provider objects based on provider object categorization criteria 224 associated with the requesting device; and provide, via the communication interface 228, to the requesting device, a response corresponding to the provider objects as categorized.

Furthermore, execution of the application 223, as will be discussed below, may further configure the intermediation server 120 and/or the controller 220 to rank the provider objects, as categorized, based on the provider object categorization criteria 224, and the response to the client device 112 and/or the requesting device may correspond to the provider objects as categorized and ranked.

Indeed, whether the intermediation server 120 responds to requests from a requesting device using the provider object categorization criteria 224 or not may depend on whether a request includes an identifier of the provider object categorization criteria 224.

While aspects of the application 223 that relate to categorization via provider object categorization criteria 224 may be implemented programmatically, in other examples the application 323 may be implemented using machine learning models. For example, the application 323 may comprise one or more machine learning models, and the like, and each set of provider object categorization criteria 224 may comprise one or more associated classifiers for use by the one or more machine learning models for classifying provider objects. Furthermore, machine learning models of the application 223 may further be trained to, and/or used for: scanning historical traffic (e.g. previous requests) to identify passengers and/or markets patterns to define clusters of searches and/or requests and/or bookings and/or purchases with different criteria relating to different passengers searches and/or requests and/or bookings and/or purchases; such criteria may then be used to build offers suited for passengers similar to the ones from the clusters.

The machine learning models of the application 223 may include machine learning and/or deep-learning and/or neural network-based models and/or algorithms, and the like including, but are not limited to: a generalized linear regression model; a random forest model; a support vector machine model; a gradient boosting regression model; a decision tree model; a generalized additive model; evolutionary programming models; Bayesian inference models, reinforcement learning models, and the like. However, any suitable machine learning model and/or deep learning model and/or neural network model is within the scope of present examples.

Figure 3:
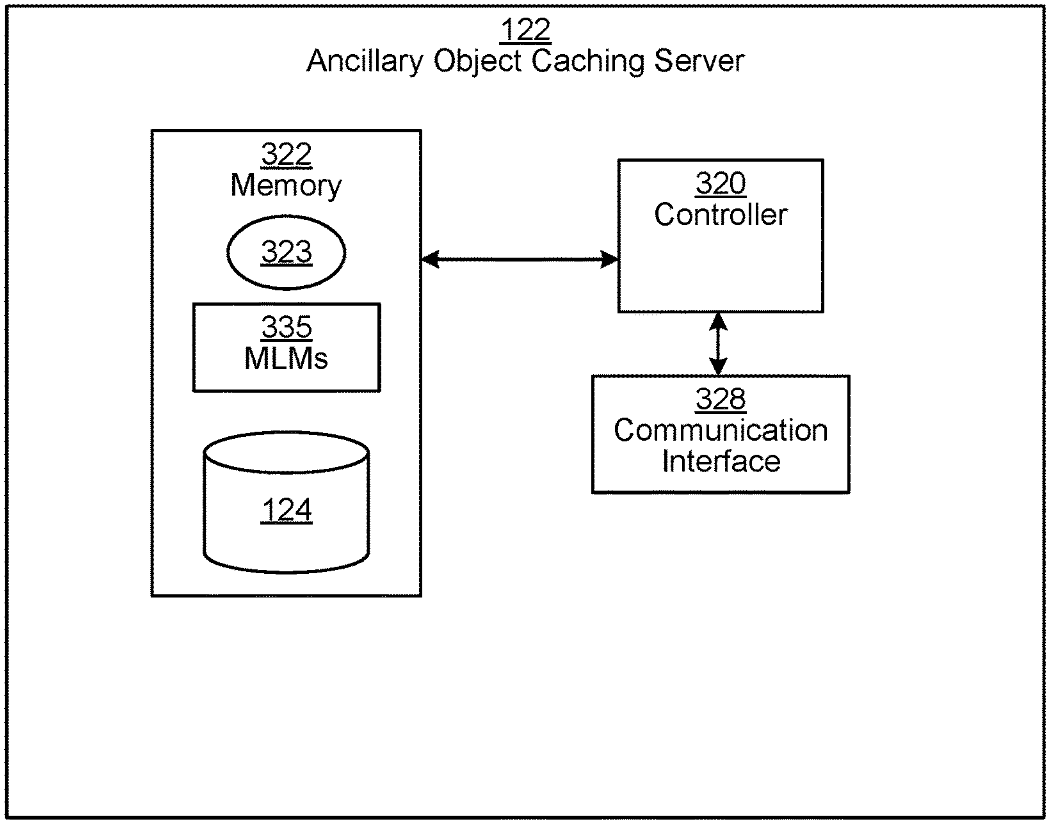
FIG. 3 depicts an example structure of one or more servers for storing and categorizing ancillary objects, according to non-limiting examples.

Attention is next directed to FIG. 3 which depicts components of the ancillary object caching server 122, which comprises a controller 320, a memory 322 storing an application 323, and a communication interface 328, which are respectively similar to the controller 220, the memory 222 and the communication interface 228, as described above The components of the ancillary object caching server 122 mentioned above can be deployed in a single enclosure, or in a distributed format. In some examples, therefore, the ancillary object caching server 122 includes a plurality of processors, either sharing the memory 322 and communication interface 328, or each having distinct associated memories and communication interfaces.

As depicted, the memory 322 may include the ancillary object cache 124 (and/or a portion thereof). However, in other examples, ancillary object cache 124 may be external to the ancillary object caching server 122, and accessible to the controller 320, for example via the communication interface 328. Indeed, the ancillary object cache 124 may be distributed between any suitable components of the system 100.

The memory 322 also stores a plurality of computer-readable programming instructions, executable by the controller 320, in the form of various applications, including the application 323. As will be understood by those skilled in the art, the controller 320 executes the instructions of the application 323 (and any other suitable applications) in order to perform various actions defined by the instructions contained therein. In the description below, the controller 320, and more generally the ancillary object caching server 122, are said to be configured to perform those actions. It will be understood that they are so configured via the execution (by the controller 320) of the instructions of the applications stored in memory 322.

Execution of the application 323, as will be discussed below, configures the ancillary object caching server 122 and/or the controller 320 to: receive predetermined ancillary objects; categorize the predetermined ancillary objects based on one or more of type and previous flight associations; and store, at the ancillary object cache 124, the predetermined ancillary objects as categorized.

While the application 323 may be implemented programmatically, in other examples the application 323 may be implemented using machine learning models. In still other examples, the application 323 may combine a programmatical implementation with an implementation using machine learning models. Indeed, as depicted, the memory 322 further stores machine learning models ("MLMs") 335 which may be used, by the controller 320, to categorize the ancillary objects based on one or more of type and previous flight associations, and determine whether an ancillary object is currently valid. In yet further examples, the machine learning models 335 of the application 223 may further be trained to, and/or used for one or more of enriching and updating of the ancillary object cache 124, by analyzing which airlines and/or provider systems 104 and/or routes and/or markets (e.g. based geographical areas, demographic, and the like) are most requested and categorize the predetermined ancillary objects accordingly; in some of these examples, validity of a subset of predetermined ancillary objects (e.g. for a given airline and/or route and/or market) may occur when predetermined ancillary objects are received, and/or or independent of a request for ancillary objects.

The machine learning models 335 may include machine learning and/or deep-learning and/or neural network-based models and/or algorithms, and the like including, but are not limited to: a generalized linear regression model; a random forest model; a support vector machine model; a gradient boosting regression model; a decision tree model; a generalized additive model; evolutionary programming models; Bayesian inference models, reinforcement learning models, and the like. However, any suitable machine learning model and/or deep learning model and/or neural network model is within the scope of present examples.

While structure of the provider system 104, the client device 112, the flight object caching server 121, the event hub device 127 and the machine learning model training system 129 is not described in detail, such components may have a similar structure as the intermediation server 120 and/or the ancillary object caching server 122, but adapted for the respective functionality thereof.

Figure 4:
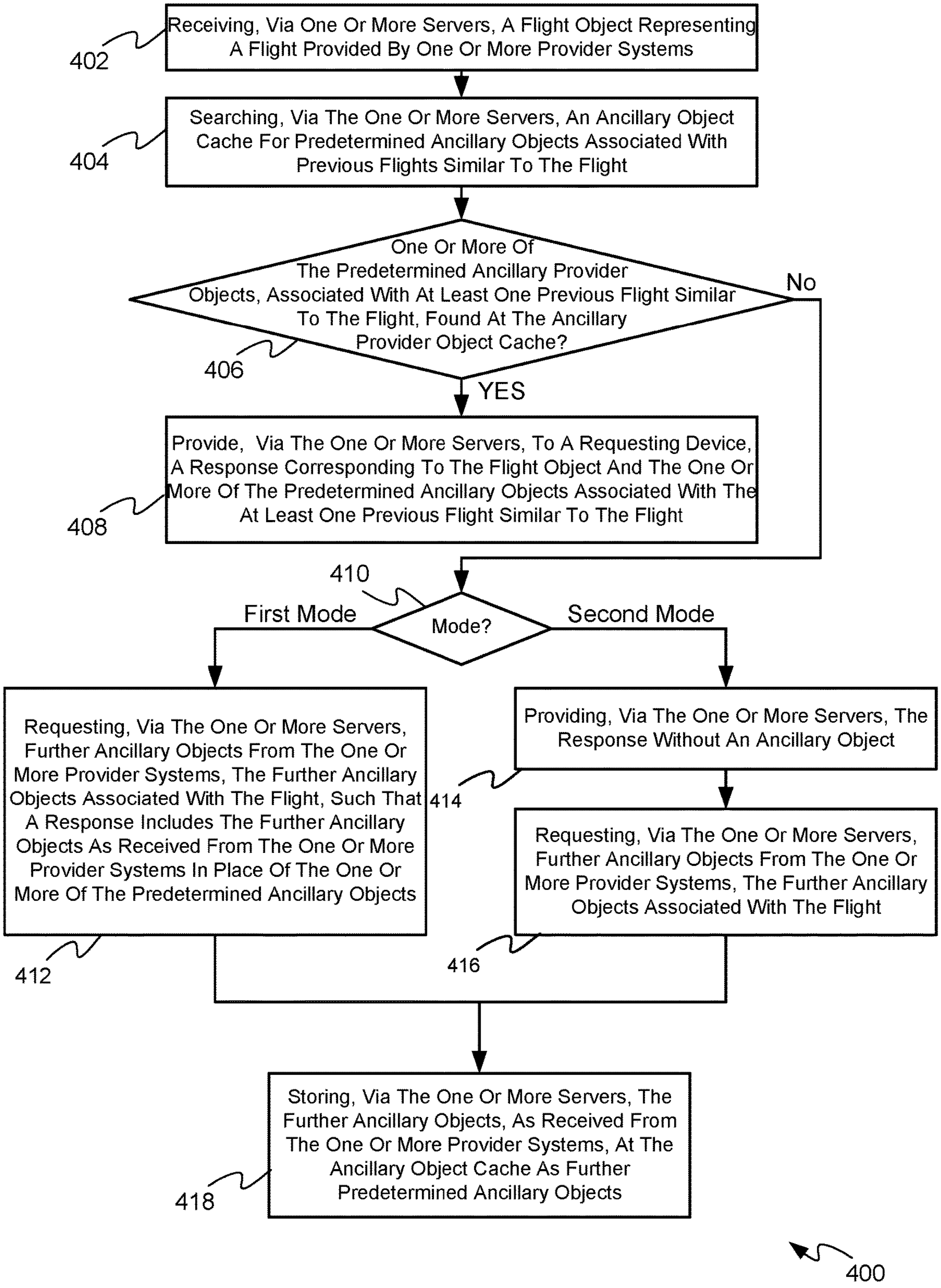
FIG. 4 depicts a method for providing ancillary objects from a cache, according to non-limiting examples.

Attention is now directed to FIG. 4 which depicts a flowchart representative of a method 400 for providing ancillary objects from a cache. The operations of the method 400 of FIG. 4 correspond to machine readable instructions that are executed by the intermediation server 120, and specifically the controller 220. In the illustrated example, the instructions represented by the blocks of FIG. 4 are stored at the memory 222 for example, as the application 223. The method 400 of FIG. 4 is one way in which the controller 220 and/or the intermediation server 120 and/or the system 100 may be configured. Furthermore, the following discussion of the method 400 of FIG. 4 will lead to a further understanding of the system 100, and its various components.

The method 400 of FIG. 4 need not be performed in the exact sequence as shown and likewise various blocks may be performed in parallel rather than in sequence. Accordingly, the elements of method 400 are referred to herein as "blocks" rather than "steps." The method 400 of FIG. 4 may be implemented on variations of the system 100 of FIG. 1, as well. In particular, while the method 400 is described as being implemented by the intermediation server 120, alternatively, the functionality of the intermediation server 120 may be distributed between a plurality of servers and/or computing devices which implement the method 400. For example, portions of the method 400 may be implemented in conjunction with one or more of the caching servers 121, 122. Hence, the method 400 will be described as being implemented by the controller 220 and/or one or more servers.

At a block 402, the controller 220 and/or one or more servers receives a flight object representing a flight provided by one or more provider systems 104.

For example, the controller 220 and/or one or more servers may receive, from a requesting device (e.g. the client device 112), a request for the flight object (e.g. a flight), and search, based on criteria of the request, at least one of the flight object cache 123 and the one or more provider systems 104 for the flight object. The criteria may define a day and/or date and/or time period for a flight, an origin, a destination, and/or any other criteria for searching for a flight. Whether the controller 220 searches the flight object cache 123 and/or the one or more provider systems 104 for the flight object may depend on a mode of the search, which may be defined by the request. For example a "fast" search mode may be for searching the flight object cache 123, while a more accurate, but slower, search mode may be for searching the one or more provider systems 104. The mode used may be selected at the client device 112 and/or a requesting device, and an indication thereof may be provided in the request. Hence, depending on mode, the controller 220 may receive, from at least one of the flight object cache 123 and the one or more provider systems 104, the flight object.

The request may further define certain ancillary services which may be requested with a flight. In a particular, the request may be for pet-related services, such as availability and/or a fee for travelling with a pet, and the like. However, the request may be for any suitable ancillary services, such as a given number of checked bags and/or carry-on bags, and the like.

Alternatively, the controller 220 and/or one or more servers may receive a flight object representing a flight provided by one or more provider systems 104 as part of a search performed by a traffic generator.

At the block 404, the controller 220 and/or one or more servers search the ancillary object cache 124 for predetermined ancillary objects associated with previous flights similar to the flight (e.g. defined by the flight object received at the block 402).

For example, as described above, a previous flight may be determined to be similar to the flight represented by the flight object received at the intermediation server 120 when the previous flight is one or more of: between a same origin and destination as the flight; provided by a same provider system and/or airline as the flight; in a same time period as the flight (e.g. a same period of the day, a same time of year (e.g. spring, summer, etc., and the like); has a same flight number as the flight; has a same and/or a similar load as the flight; and the like. Indeed, determining whether a previous flight is similar to the flight represented by the flight object received at the intermediation server 120 may be machine learning based, as described in more detail below.

In some examples, the search may be for predetermined ancillary objects representing ancillary services defined in the request. Alternatively, the request may not define certain ancillary services to be requested with a flight, and the search may be for any predetermined ancillary objects representing ancillary services which may be offered in a response to the request.

Regardless, when the flight is for a given airline (e.g. a given provider system 104), a given day and/or time and/or between a given origin and destination, the controller 220 and/or one or more servers may search the ancillary object cache 124 for predetermined ancillary objects previously provided for historical flights for the airline having similar criteria. Using the example of an ancillary service of travelling with a pet, the controller 220 and/or one or more servers search the ancillary object cache 124 for previous pet-related services provided by the airline on previous flights; predetermined ancillary objects stored at the ancillary object cache 124 found in such a search may include, but is not limited to, a previous cost, conditions, rules, etc. thereof for travelling with a pet. For example, such costs and/or conditions and/or rules may vary by flight, origin, destination, date, etc.

However, an airline and/or provider system 104 may provide similar ancillary objects for any and/or all flights offered, and hence the controller 220 and/or the one or more servers search the ancillary object cache 124 for predetermined ancillary objects offered by the airline and/or provider system 104 on previous flights whether specific to the flight object received at the block 404 and/or specific to an airline and/or provider system 104 offering the flight object. Again using the example of travelling with a pet, an airline may have a standard fee and/or conditions and/or rules for travelling with a pet which may not be specific to a date, origin, destination, etc.

At a block 406, the controller 220 and/or one or more servers determines whether one or more of the predetermined ancillary objects associated with at least one previous flight similar to the flight, are found at the ancillary object cache 124 (e.g. due to the search at the block 404).

When one or more of the predetermined ancillary objects, associated with at least one previous flight similar to the flight, are found at the ancillary object cache 124 (e.g. a "YES" decision at the block 406) at a block 408, the controller 220 and/or the one or more servers retrieve the predetermined ancillary objects and provide, via the communication interface 228, to the requesting device (e.g. the client device 112), a response corresponding to the flight object (e.g. received at the block 402) and the one or more of the predetermined ancillary objects associated with the at least one previous flight similar to the flight.

Again using the example of travelling with a pet, the controller 220 and/or the one or more servers may retrieve an ancillary object that corresponds to a price and/or conditions and/or rules for travelling with a pet that was previously offered on a previous flight similar to the flight, and provide that ancillary object to the requesting device with the flight object (e.g. received at the block 402). Indeed, the controller 220 and/or the one or more servers may assemble the flight object and the ancillary object together into a provider object having a total price corresponding to a sum of the prices of the flight object and the ancillary objects. However, in other examples, prices for each of the flight object and the ancillary object may be broken out in the provider object, such that the ancillary object may be selected for purchase, or not, at the client device 112 and/or the requesting device.

In yet further examples, the method 400 may further include the controller 220 and/or the one or more servers providing the predetermined ancillary objects, associated with the at least one previous flight similar to the flight, in the form of a calendar and/or with suggestions of offers and/or flights and/or ancillary objects that are better than other offers and/or other flights and/or other ancillary objects.

As will be described below, the intermediation server 120 may further categorize the provider objects (e.g. combinations of flight objects and one or more ancillary objects) according to the provider object categorization criteria 224.

Regardless, the intermediation server 120 returns a response which may include a flight object that represents a flight, and ancillary objects that represent services, and the like, which may be purchased in a bundle with the flight. Indeed, the intermediation server 120 may provide a response that includes a plurality of flight objects each, representing a flight, including one or more ancillary objects, such as upgrades to a given number of checked bags, a premium seat, pet-related services, and the like.

In some examples, the flight object and the one or more predetermined ancillary objects may comprise New Distribution Capability (NDC) offers. However, a flight object may comprise an Edifact message and the like, which may be combined and/or assembled with predetermined NDC ancillary objects. Hence, the method 400 may provide a process for bundling and/or assembling flights represented by Edifact messages with NDC offers of services not normally offered with Edifact messages.

Returning to the block 406, when one or more of the predetermined ancillary objects, associated with at least one previous flight similar to the flight, are not found at the ancillary object cache 124 (e.g. a "NO" decision at the block 406), at a block 410, the controller 220 and/or the one or more servers may determine a mode for a request.

For example in a first mode, at a block 412, the controller 220 and/or the one or more servers may request further ancillary objects from the one or more provider systems 104, the further ancillary objects associated with the flight (e.g. which corresponds to the flight object received at the block 402), such that a response provided to the requesting device (e.g. the client device 112) includes the further ancillary objects as received from the one or more provider systems 104 in place of the one or more of the predetermined ancillary objects. The block 412 may include receiving the further ancillary objects from the one or more provider systems 104.

Hence, in this mode, the controller 220 and/or the one or more servers provides a response (e.g. similar to the response of the block 408) with further ancillary objects received from the one or more provider systems 104, for example in the form of one or more service lists received from the one or more provider systems 104. The controller 220 and/or the one or more servers may for example, generate offers from the flight object received at the block 402 and combinations of ancillary services indicated by the service lists.

However, in a second mode, at a block 414, the controller 220 and/or the one or more servers may provide a response to the requesting device (e.g. the client device 112) without an ancillary object. At block 416, the controller 220 and/or the one or more servers may request further ancillary objects from the one or more provider systems 104, the further ancillary objects associated with the flight, for example in the form of one or more service lists received from the one or more provider systems 104. The block 416 may include receiving the further ancillary objects from the one or more provider systems 104.

Hence, in this mode, the controller 220 and/or the one or more servers provides a response (e.g. similar to the response of the block 408) without further ancillary objects, for example to reduce time for a response.

In some examples, however, a mode may be predetermined such that the controller 220 and/or the one or more servers skips the block 410 and implements the predetermined mode.

Regardless of mode, at a block 418, the controller 220 and/or the one or more servers stores the further ancillary objects (e.g. as received at the block 412 or the block 416), as received from the one or more provider systems 104, at the ancillary object cache 124 as further predetermined ancillary objects. The further predetermined ancillary objects may be categorized based on one or more of type and previous flight associations.

Indeed, the ancillary object caching server 122 may continue to receive ancillary objects from the event hub device 127 and categorize them on an ongoing basis. In particular, the controller 220 and/or the one or more servers may: receive predetermined ancillary objects; categorize the predetermined ancillary objects based on one or more of type and previous flight associations; and store, at the ancillary object cache 124, the predetermined ancillary objects as categorized.

However, as mentioned previously, such categorization may be different from categorizing provider objects of a response provided to the client device 112 and/or a requesting device as defined by the provider object categorization criteria 224. Indeed, categorization of ancillary objects for storage at the ancillary object cache 124 may be used to retrieve predetermined ancillary objects for building and/or generating a response, and categorization of provider objects of the response as defined by the provider object categorization criteria 224 may occur independent of such categorization.

Figure 5:
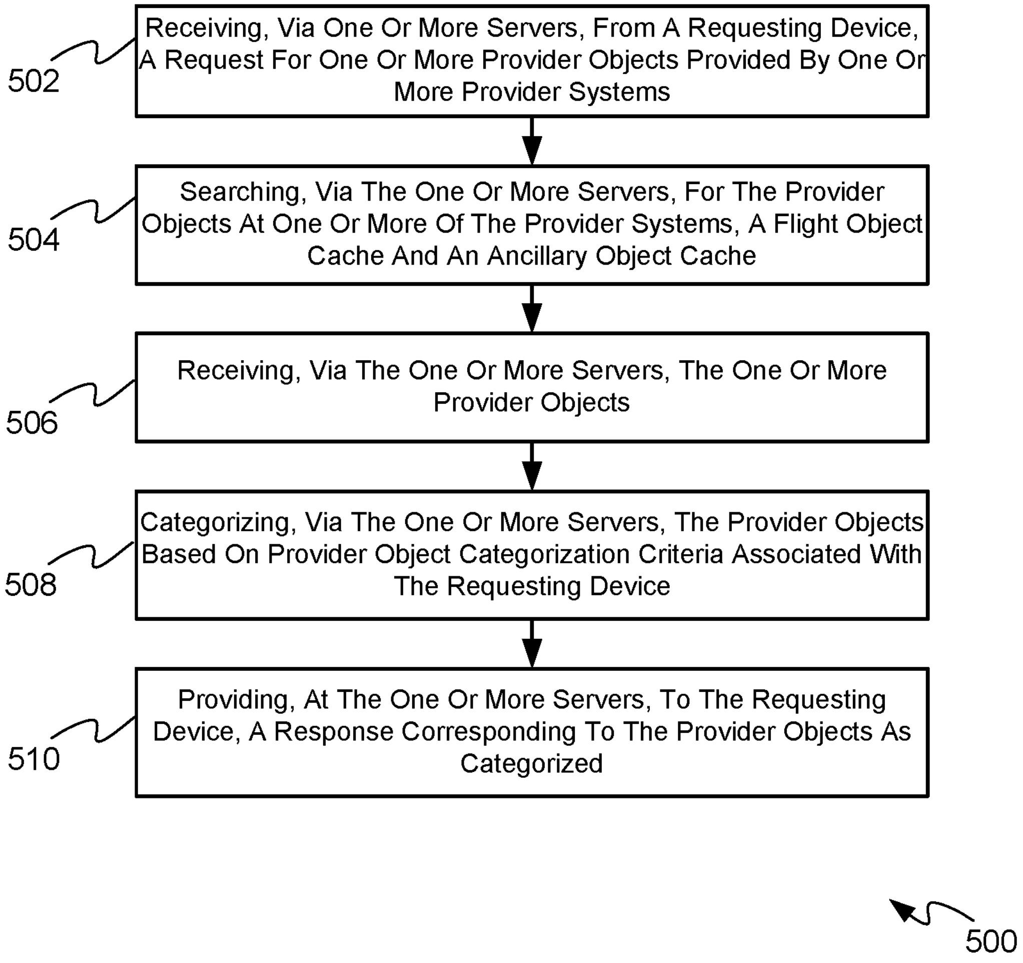
FIG. 5 depicts a method for providing categorized provider objects, according to non-limiting examples

Indeed, attention is now directed to FIG. 5 which depicts a flowchart representative of a method 500 for providing categorized provider objects, for example as based on the provider object categorization criteria 224. The operations of the method 500 of FIG. 5 correspond to machine readable instructions that are executed by the intermediation server 120, and specifically the controller 220. In the illustrated example, the instructions represented by the blocks of FIG. 5 are stored at the memory 222 for example, as the application 223. The method 500 of FIG. 5 is one way in which the controller 220 and/or the intermediation server 120 and/or the system 100 may be configured. Furthermore, the following discussion of the method 500 of FIG. 5 will lead to a further understanding of the system 100, and its various components.

The method 500 of FIG. 5 need not be performed in the exact sequence as shown and likewise various blocks may be performed in parallel rather than in sequence. Accordingly, the elements of method 500 are referred to herein as "blocks" rather than "steps." The method 500 of FIG. 5 may be implemented on variations of the system 100 of FIG. 1, as well. In particular, while the method 500 is described as being implemented by the intermediation server 120, alternatively, the functionality of the flight object caching server 121 may be distributed between a plurality of servers and/or computing devices which implement the method 500.

Hence, the method 500 will be described as being implemented by the controller 220 and/or one or more servers.

At a block 502, the controller 220 and/or one or more servers receives from a requesting device (e.g. the client device 112), a request for one or more provider objects provided by one or more provider systems 104. The request may be similar to that described above with respect to the block 402 of the method 400, but the request may indicate that the provider object categorization criteria 224 are to be used to categorize provider objects. For example, the request may include an identifier of a subset of the provider object categorization criteria 224 to use to categorize provider objects (e.g. a business identifier which may be stored at the memory 222 in association with the subset of the provider object categorization criteria 224).

At a block 504, the controller 220 and/or one or more servers searches for the provider objects at one or more of the provider systems 104, the flight object cache 123 and the ancillary object cache 124.

The searching may depend on a type of the request received at the block 502. For example, when the request comprises a shopping request (e.g. an NDC shopping request), the controller 220 and/or one or more servers may search for the provider objects by one or more of: searching one or more of the provider systems 104 and the flight object cache 123 for flight objects that meets criteria of the request; and searching the ancillary object cache 124 for ancillary objects associated with the flight objects, as described above with respect to the method 400. Such a mode is similar to that described above with respect to the method 400.

However, when the request comprises a pricing request (e.g. an NDC pricing request), the controller 220 and/or the one or more servers may search for the provider objects by one or more of: searching the provider systems 104 (e.g. rather than the flight object cache 123) for flight objects that meets criteria of the request; and request, from the provider systems 104, a service list defining ancillary objects associated with the flight objects. Hence, in these examples, the controller 220 and/or the one or more servers may receive the provider objects by one or more of: receiving one or more of the flight objects and the service list; and assembling one or more of the flight objects and the ancillary objects defined by the service list into the provider objects for categorization. In particular, for pricing requests, a more precise indication of pricing and available services may be preferred than with shopping requests; as such, when the request comprises a pricing request, the controller 220 and/or the one or more servers may retrieve flight objects and a service list from a provider system 104 rather than search the caches 123, 124.

At a block 506, the controller 220 and/or one or more servers receives the one or more provider objects, for example from the provider systems 104 and/or the caches 123, 124.

At a block 508, the controller 220 and/or one or more servers categorizes the provider objects based on the provider object categorization criteria 224 associated with the requesting device. For example, the controller 220 and/or one or more servers attempts to match characteristics and/or features of the provider objects with the provider object categorization criteria 224; when a match and/or a partial match occurs between a provider object and a particular set of provider object categorization criteria 224, the provider object may be categorized under that of provider object categorization criteria 224.

In particular, the controller 220 and/or one or more servers categorizing the provider objects may include building offers from provider objects and/or combining provider objects, which are based on the provider object categorization criteria 224 (e.g. rather than classifications provided by the provider systems 104.

In some examples, the controller 220 and/or one or more servers further ranks the provider objects, as categorized, based on the provider object categorization criteria 224. For example, characteristics and/or features of the provider objects may not be an exact match to a set of the provider object categorization criteria 224 and the controller 220 and/or one or more servers may further rank the provider objects according to how well the provider objects match a set of the provider object categorization criteria 224.

Indeed, in some examples, at the block 508, a perfect match may not be found between characteristics and/or features of the provider objects. Hence, the intermediation server 120 may combine a plurality of combinations of provider objects (flight and ancillary services, which may be from the same provider system 104), based on the provider object categorization criteria 224, to obtain better matches. Such better matches may be higher ranked than provider objects not combined with other provider objects. In yet further examples, certain parameters of the provider objects, as categorized, may be higher weight as compared to other parameters, as described in more detail below, Such a weighting scheme may be used to emphasize (and/or deemphasize) importance of certain parameters; such a weighting scheme may be included in the provider object categorization criteria 224, Furthermore, in some examples, all parameters of the provider objects may be associated with a weight, while, in other examples, all subset of the provider objects may be associated with a weight.

At a block 510, the controller 220 and/or one or more servers provides to the requesting device, a response corresponding to the provider objects as categorized. When the provider objects are categorized and ranked, the response corresponds to the provider objects as categorized and ranked.

Recalling that the present specification refers to at least two types of categorization and/or classification, specifically categorization and/or classification of provider objects for storage at the caches 123, 124 and categorization and/or classification of the provider objects using the provider object categorization criteria 224, categorization of ancillary objects for storage at the ancillary object cache 124 is next described.

Figure 6:
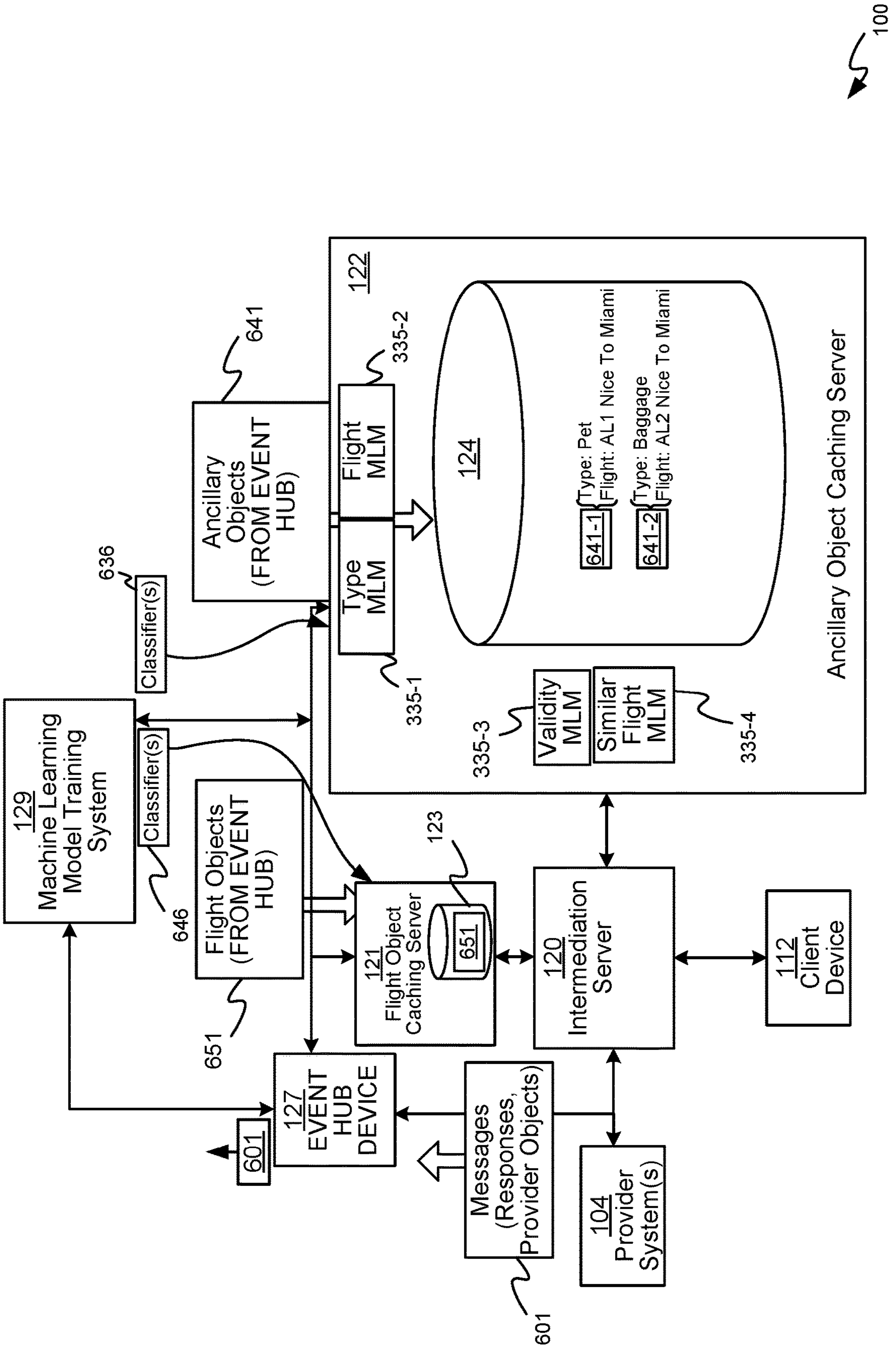
FIG. 6 depicts the system of FIG. 1 training machine learning modules to provide ancillary objects from a cache, according to non-limiting examples.

Attention is directed to FIG. 6, which depicts the system 100, but without the network 116. Rather FIG. 6 shows communication links between the components of the system 100 which are represented as double ended-arrows therebetween; such communication links may include the network 116. Otherwise, FIG. 6 is similar to FIG. 1, with like components having like numbers. In particular, FIG. 6 depicts an example of example of training the machine learning models 335 as implemented at the ancillary object caching server 122.

In FIG. 6, the event hub device 127 is receiving messages 601 from the provider system 104 as described above. The messages 601, as depicted, include provider objects, and the like and may be flight objects and ancillary objects. The event hub device 127 provides the messages 601 to the machine learning model training system 129 which generates classifiers 636 for the machine learning models 335 and provides the classifiers 636 to the corresponding machine learning models 335 implemented at the ancillary object caching server 122.

For example, as depicted, the ancillary object caching server 122 is implementing a type determining machine learning model 335-1, a flight association determining machine learning model 335-2, a validity estimation machine learning model 335-3, and a similar flight determining machine learning model 335-4. As such, the machine learning model training system 129 generates suitable classifiers 636 for each of these machine learning models 335 implemented at the ancillary object caching server 122.

As depicted, the event hub device 127 further provides ancillary objects 641 of the messages 601 to the ancillary object caching server 122. While the ancillary objects 641 are depicted as being different from the messages 601, the ancillary objects 641 may be received at the ancillary object caching server 122 in the form of the messages 601.

As depicted, for example, the machine learning models 335-1, 335-2 may be used to classify ancillary objects 641 according to type and flight association for storage at the ancillary object cache 124. For example, the type determining machine learning model 335-1 may classify ancillary objects 641 by type, for example as a checked baggage service (e.g. including numbers of checked bags and/or carry-on bags), a pet-related service, a seat upgrade, and the like. Similarly, the flight association determining machine learning model 335-2 may classify the ancillary objects 641 according to flights with which the ancillary objects 641 were offered (e.g. by airline, origin/destination, date, time of day, etc.).

The validity estimation machine learning model 335-3 classifies the ancillary objects 641 as to whether or not the services and/or prices associated with the ancillary objects 641 are currently valid. The similar flight determining machine learning model 335-4 determines whether a previous flight is similar to the flight represented by the flight object received at the intermediation server 120. However, the validity estimation machine learning model 335-3 and the similar flight determining machine learning model 335-4 may not be used until a search for ancillary objects 641 stored at the ancillary object cache 124 occurs. While not depicted a machine learning model may also be used to determine whether the ancillary objects 641 represent given ancillary services in a search of the ancillary object cache 124.

As depicted, the ancillary object cache 124 stores two ancillary objects 641-1, 641-2 each categorized according to a respective type and flight association. For example, the ancillary object 641-1 may correspond to a pet-related service type for a previous flight from Nice to Miami, offered by a particular provider system 104 and/or airline (e.g. "AL1"), and the ancillary object 641-2 may correspond to a checked bag upgrade for a previous flight from Nice to Miami offered by the same particular provider system 104, or a different particular provider system 104 (e.g. "AL2").

In general, the machine learning model training system 129 may also generate suitable classifiers 646 for machine learning models (not depicted) implemented at the flight object caching server 121, which may classify flight objects 651 received at the flight object caching server 121 from the event hub device 127, for example in the form of the messages 601, and store the flight objects 651, as classified, at the flight object cache 123.

As mentioned previously, the caching servers 121, 122 may be combined into one caching server which receives the classifiers 636, 646 and the messages 601 and categorizes the messages 601 (e.g. as ancillary objects by type and/or flight, or as flight objects) and stores the messages 601, as categorized, in a common cache.

Attention is next directed to FIG. 7 to FIG. 11 which depicts examples of the method 400.

Figure 7:
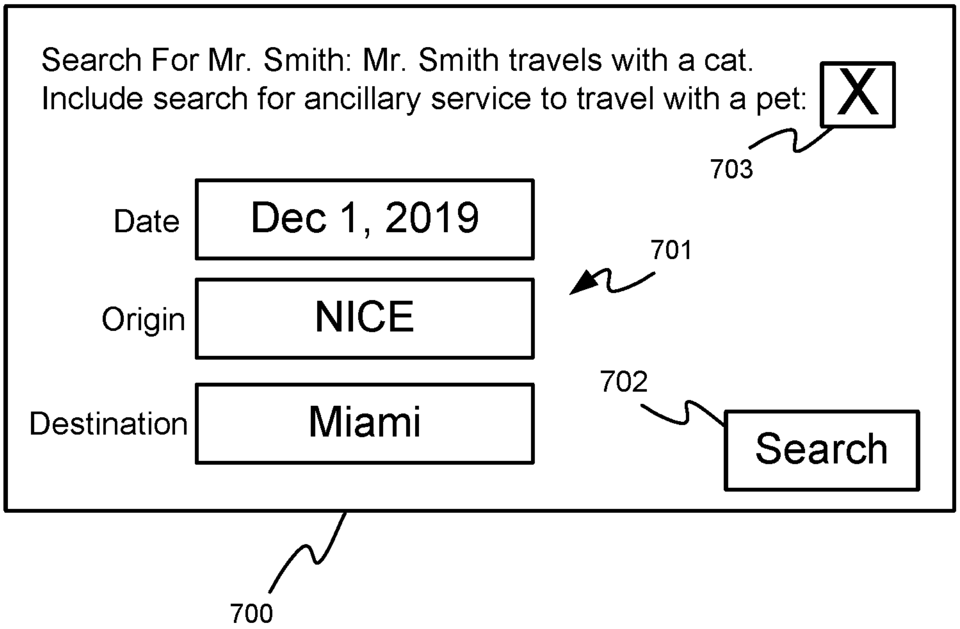
FIG. 7 depicts an example graphic user interface (GUI) which may be provided at a display screen of a client device, to search for flights and ancillary services, according to non-limiting examples.

Attention is directed to FIG. 7 which depicts an example graphic user interface (GUI) 700 which may be provided at a display screen of the client device 112. The GUI 700 includes fields 701 for entering criteria for searching for flights including date, origin and destination fields 701. As depicted, the criteria is for a search for flights from Nice to Miami on Dec. 1, 2019. The GUI 700 further includes a virtual button 702 for initiating the search.

The GUI 700 further includes a field 703 which may be selected (e.g. as depicted), or not selected, to include searching for a pet-related service when searching for flights. In particular, the GUI 700 indicates that the search of flights may be for a given client (e.g. "Mr. Smith") who has previously travelled with a cat (e.g. as determined from a client record), and hence the client device 112 includes the field 703 in the GUI 700 such that the search of flights may also include a search for ancillary services for travelling with a pet. In particular, when the virtual button 702 is actuated (e.g. via an input device of the client device 112), a request is transmitted to the intermediation server 120 that includes the criteria of the fields 701 and an indication to search for the pet-related service.

Figure 8:
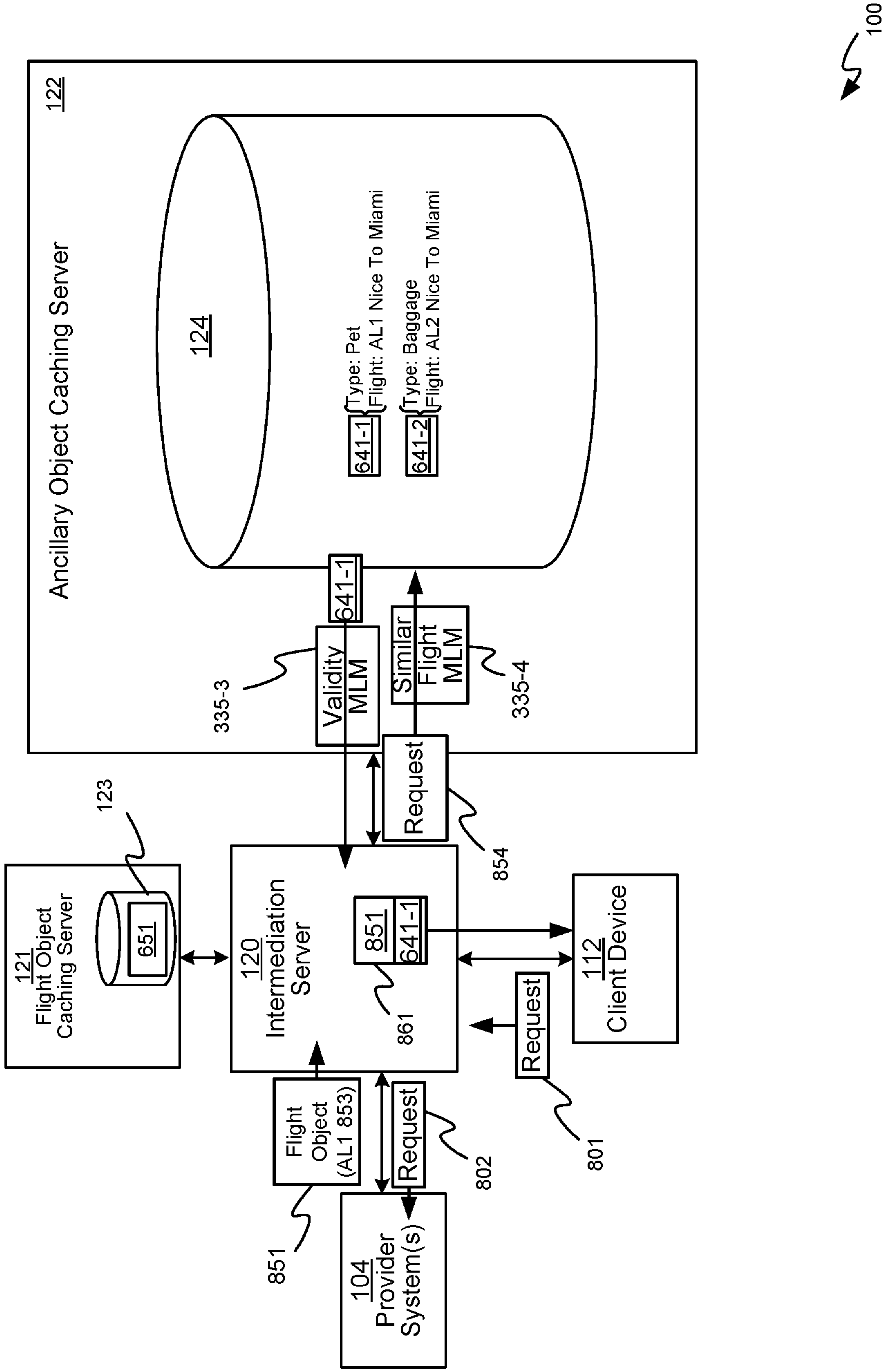
FIG. 8 depicts a client device transmitting a request to the intermediation server of the system of FIG. 1, the request including criteria to search for flights and ancillary services, according to non-limiting examples.

Attention is directed to FIG. 8, which is substantially similar to FIG. 6, with like components having like numbers, but without the machine learning model training system 129 and the event hub device 127 which are nonetheless assumed to be present and operating as described above.

FIG. 8 depicts the client device 112 transmitting a request 801 to the intermediation server 120 that is understood to include the criteria of the fields 701 and an indication to search for the pet-related service. The request 801 may comprise a shopping request and/or an NDC shopping request. The request 801 may be generated when the virtual button 702 is actuated. In response to receiving the request 801, the intermediation server 120 transmits a request 802 to the provider system 104 (e.g. one or more provider systems 104) to search for flight objects corresponding to the criteria of the request. While not depicted, the intermediation server 120 may also search the flight object cache 123 for flight objects 651 corresponding to the criteria of the request.

As depicted, the provider system 104 returns a flight object 851 to the intermediation server 120 (e.g. which receives the flight object 851, for example at the block 402 of the method 400). The flight object 851 may represent a flight that meets the criteria of the fields 701, for example a flight (e.g. having flight number "AL1 853) from Nice to Miami on Dec. 1, 2019 for a given airline (e.g. "AL1").

The intermediation server 120 may then search (e.g. at the block 404 of the method 400) the ancillary object cache 124 for predetermined ancillary objects 641 associated with previous flights similar to the flight represented by the flight object 851. The search may be for all predetermined ancillary objects 641 associated with previous flights similar to the flight represented by the flight object 851, and/or the search may be for predetermined ancillary objects 641 that represent an ancillary service indicated in the request 801 (e.g. a pet-related service). For example, as depicted, the intermediation server 120 transmits a request 854 to the ancillary object caching server 122 that includes criteria for searching the ancillary object cache 124 for predetermined ancillary objects 641 associated with previous flights similar to the flight represented by the flight object 851. The request 854 may hence include indicators of the flight represented by the flight object 851 (e.g. indicators of airlines, origin/ destination (e.g. flight indicators), an indicator to search for pet-related services (e.g. ancillary service indicators), and the like).

As depicted, the ancillary object caching server 122 receives the request 854 the similar flight determining machine learning model 335-4 may be used to determine, based on flight indicators in the request 854, that a previous flight associated with one or more of the ancillary objects 641 is similar to the flight represented by the flight object 851. The ancillary object caching server 122 further determines, based on the ancillary service indicators in the request 854, that an ancillary object 641 represents a service indicated in the request 854. Indeed, while not depicted, the search based on ancillary service indicators may also be machine learning model based. As depicted, the ancillary object caching server 122 determines that the ancillary object 641-1 meets the criteria of the request 854. In particular, as depicted, the ancillary object caching server 122 may further use the validity determining machine learning model 335-3 to determine that the ancillary object 641-1 is valid. The ancillary object caching server 122 returns the ancillary object 641-1 to the intermediation server 120 (e.g. a "YES" decision occurs at the block 406 of the method 400).

The intermediation server 120 may assemble the flight object 851 with the ancillary object 641-1 into a provider object 861 and provide (e.g. at the block 408 of the method 400) the provider object 861 to the client device 112.

Figure 9:
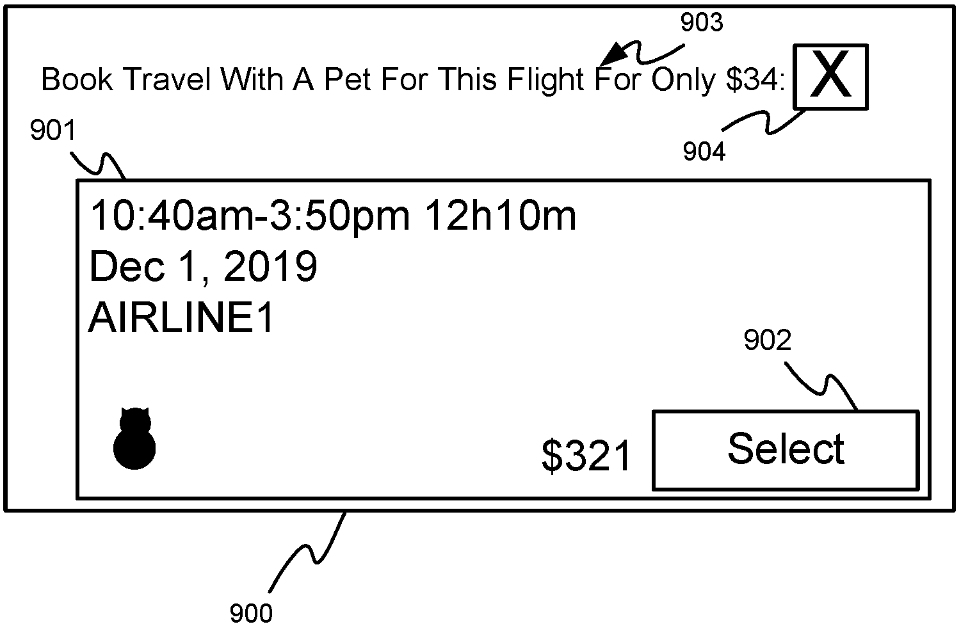
FIG. 9 depicts an example GUI which may be provided at a display screen of a client device in response to receiving a provider object that represents a flight and an ancillary service, according to non-limiting examples.

Attention is directed to FIG. 9 which depicts an example GUI 900 which may be provided at a display screen of the client device 112 in response to receiving the provider object 861. In particular, the GUI 900 includes a representation 901 of the flight object 851 that indicates details of the associated flight, including a cost, and a virtual button 902 for selecting the flight object 851 for purchase. The GUI 900 further includes an indication 903 of the ancillary object 641-1, and a field 904 which may be selected (e.g. as depicted), to include purchase of the ancillary object 641-1 when the virtual button 902 is selected. When the virtual button 902 is actuated and the field 904 is selected a pricing request may be transmitted to the intermediation server 120 which responsively determines a final price for the flight and ancillary service, for example by searching and/or querying the provider system 104 for provider objects that represent the flight and ancillary service.

Indeed, FIG. 9 illustrates that personalized content may be provided based on a client and/or traveler profiles and/or files, and further that a-la-carte offers corresponding to ancillary objects may be provided. FIG. 7 and FIG. 9 further illustrate that searching for various ancillary services may occur.

While the method 400 is described with respect to one flight object and one ancillary object, it is understood that a plurality of flight objects (e.g. tens to hundreds to thousands of flight objects and/or any suitable number of flight objects) may be returned as a result of a search, and the method 400 may be applied to a plurality of flight objects.

For example, while not depicted, the GUI 900 may be adapted to indications of a plurality of flight objects and/or ancillary objects to show competitive prices and/or services on flights; such example by displaying and/or rendering indications of a plurality of flight objects and/or ancillary objects by one or more of price and date. Such indications may be arranged in a grid format, for example.

Figure 10:
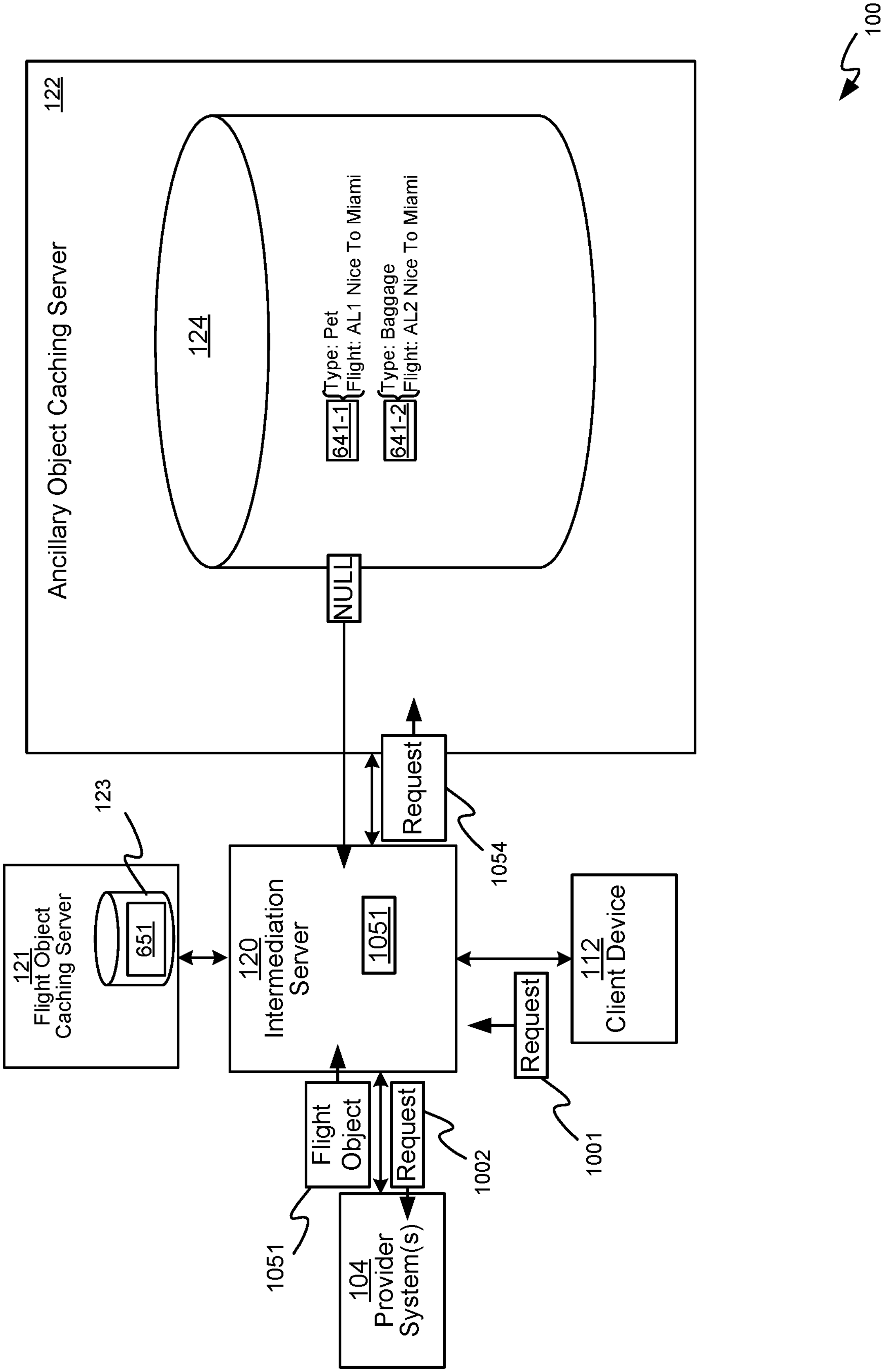
FIG. 10 depicts the intermediation server of the system of FIG. 1, determining that no ancillary objects meet criteria of a request from a client device, according to non-limiting examples.
Figure 11:
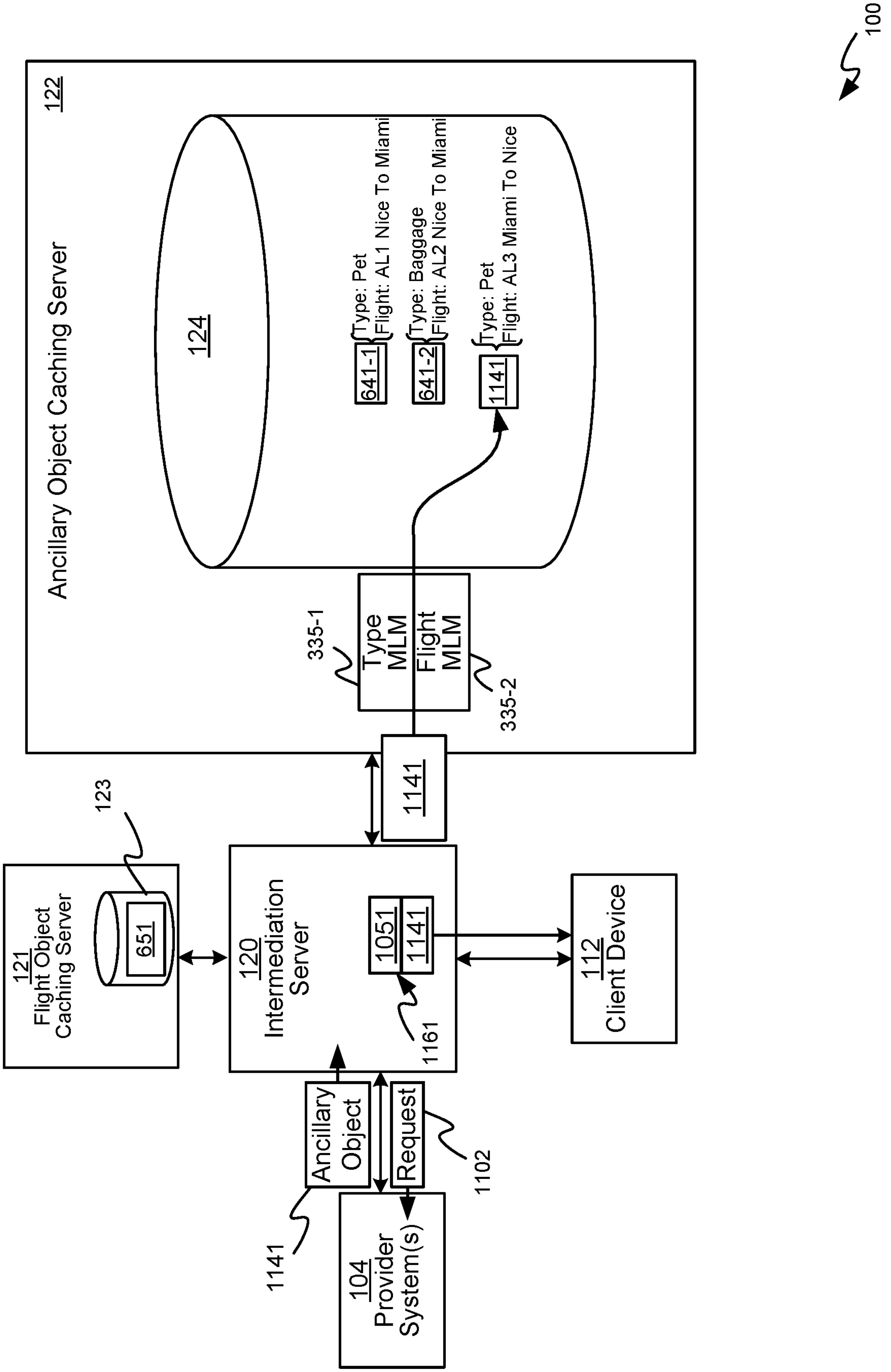
FIG. 11 depicts the intermediation server of the system of FIG. 1, requesting further ancillary objects from a provider system, according to non-limiting examples.

Attention is next directed to FIG. 10 and FIG. 11, which are substantially similar to FIG. 8, with like components having like numbers and which depict an example in which a "NO" decision occurs at the block 404 of the method 400.

FIG. 10 depicts the client device 112 transmitting a request 1001 to the intermediation server 120 that is understood to include criteria for searching for a flight and an ancillary service, as described above. The intermediation server 120 receives the request 1001 and searches (e.g. via a request 1002) the provider system 104 (and/or the flight object cache 123) for a flight object that meets the criteria of the request 1001. As depicted, the provider system 104 returns a flight object 1051, which is used to search (e.g. via a request 1054) the ancillary object cache 124, as described above. However, in the examples, no ancillary object 641 is found (e.g. a "NO" decision occurs at the block 404 of the method 400), and a "NULL" result is returned.

With reference to FIG. 11, and assuming that the intermediation server 120 is in a mode represented by the block 412 of the method 400, in response to receiving the NULL result, the intermediation server 120 requests (e.g. at the block 412 of the method 400) further ancillary objects from the provider system (e.g. e.g. via a request 1102), the further ancillary objects associated with the flight represented by the flight object 1051.

As depicted, the provider system 104 returns an ancillary object 1141 to the intermediation server 120 which stores (e.g. at the block 418 of the method 400) the ancillary object 1141 at the ancillary object cache 124. For example, as depicted intermediation server 120 transmits the ancillary object 1141 to the ancillary object caching server 122 which classifies (e.g. via the machine learning models 335-1, 335-2) and stores the ancillary object 1141 at the ancillary object cache 124, as classified. For example, as depicted the ancillary object 1141 is classified as a pet-related service type, for flights offered by an airline "AL3" on flights from Miami to Nice (e.g. the request 1001 may be for flights from Miami to Nice). For example, the search represented by the request 1001 may be for flights from Miami to Nice on a given date, and the flight object 1051 may be for a flight from Miami to Nice on the given date provided by the airline "AL3".

As depicted, the intermediation server 120 returns the flight object 1051 and the ancillary object 1141 to the client device 112 as a provider object 1161.

In other examples, however, for example, when the intermediation server 120 is in a mode represented by the block 414 and the block 416 of the method 400, the intermediation server 120 may return the flight object 1051 without an ancillary object (e.g. at the block 414 of the method 400) and perform the search (e.g. at the block 416 of the method 400) for the ancillary object 1141 "offline", as described above.

Attention is next directed to FIG. 12 to FIG. 15 which depicts examples of the method 500.

Figure 12:
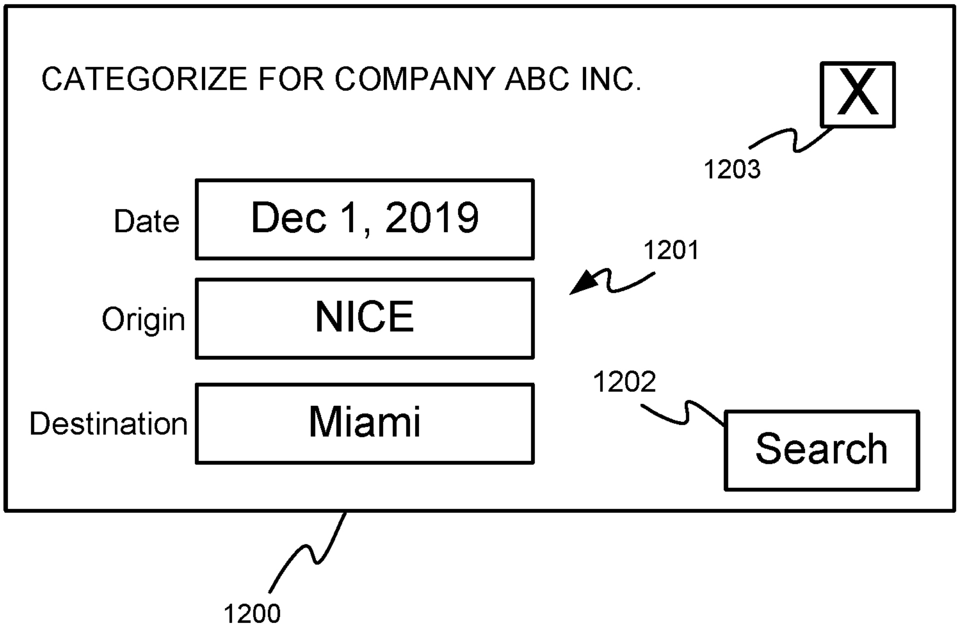
FIG. 12 depicts an example GUI) which may be provided at a display screen of a client device, to search for provider objects that meet provider object categorization criteria associated with the client device, according to non-limiting examples.

Attention is directed to FIG. 12 which depicts an example graphic user interface (GUI) 1200 which may be provided at a display screen of the client device 112. The GUI 1200 includes fields 1201 for entering criteria for searching for flights including date, origin and destination fields 1201, similar to the GUI 700. As depicted, the criteria is for a search for flights from Nice to Miami on Dec. 1, 2019. The GUI 1200 further includes a virtual button 1202 for initiating the search.

The GUI 1200 further includes a field 1203 which may be selected (e.g. as depicted) to include categorizing provider objects that may be returned as a result of the search for flights according to provider object categorization criteria 224 associated with the client device 112 and/or for example a given entity and/or company (e.g. as depicted "ABC INC.").

Figure 13:
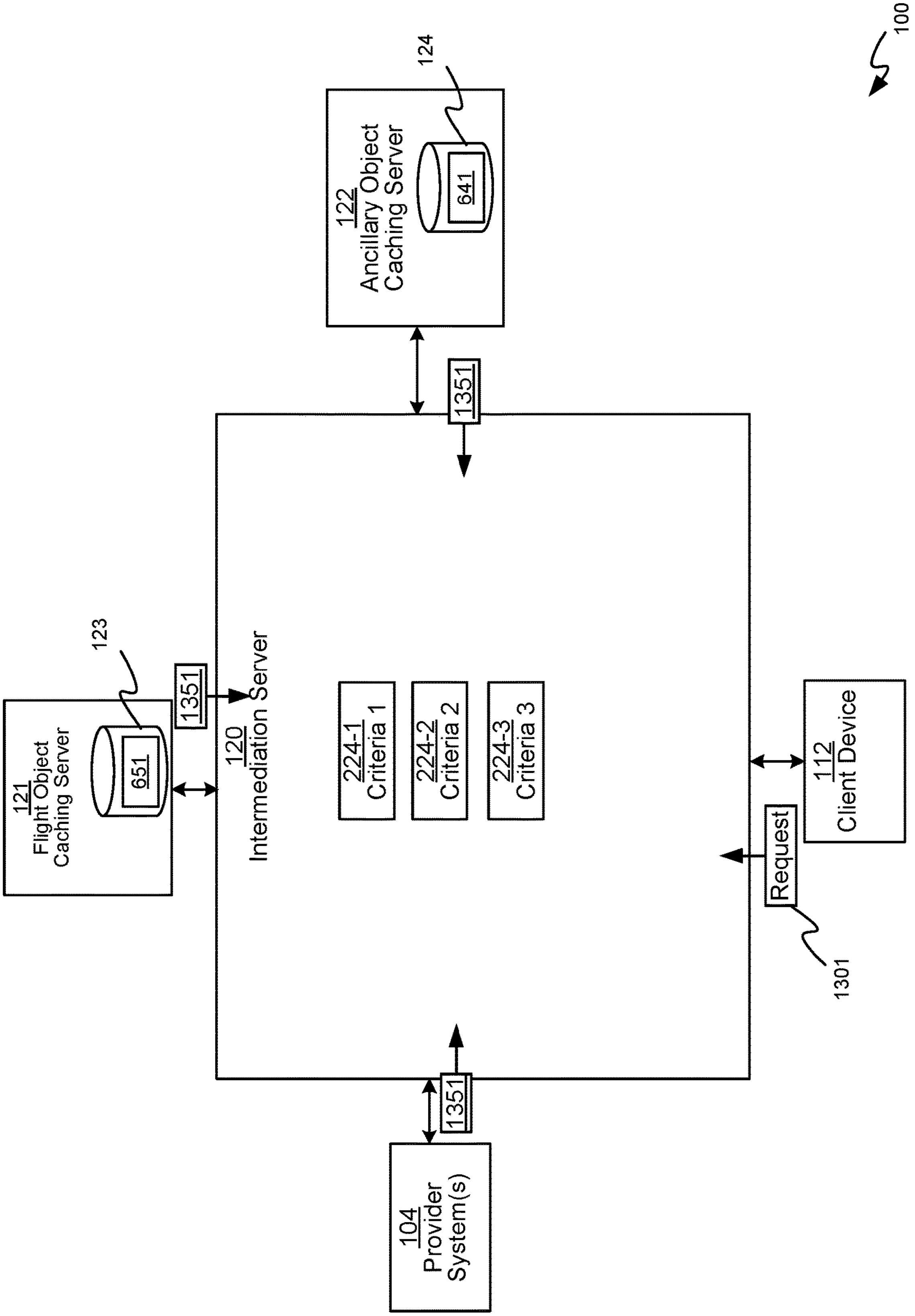
FIG. 13 depicts a client device transmitting a request to the intermediation server of the system of FIG. 1, the request including criteria to search for provider objects that meet provider object categorization criteria associated with the client device, according to non-limiting examples.

Attention is next directed to FIG. 13, which is substantially similar to FIG. 8, with like components having like numbers. However, details of the ancillary objects 641 are not depicted in FIG. 13.

FIG. 13 depicts the client device 112 transmitting a request 1301 (e.g. a shopping request) to the intermediation server 120 that is understood to include the criteria of the fields 1201 and an indication to categorize provider objects that may be returned as a result of the search for flights according to provider object categorization criteria 224 associated with the given entity and/or company. The request 1301 may be generated when the virtual button 1202 is actuated.

In response to receiving (e.g. at the block 502 of the method 500) the request 1301, the intermediation server 120 searches (e.g. at the block 504 of the method 500) the provider system 104 and/or the flight object cache 123 and/or the ancillary object cache 124 for provider objects (e.g. flight objects and/or ancillary objects) that meet the criteria of the request 1301. As depicted, provider objects 1351 may be received (e.g. at the block 506 of the method 500) at the intermediation server 120 from the provider system 104 and/or the flight object cache 123 and/or the ancillary object cache 124 as a result of the search. While exchange of requests are not depicted between the intermediation server 120 and the provider system 104 and/or the flight object cache 123 and/or the ancillary object cache 124, it is understood that exchange of requests may occur to implement the search (e.g. as described above with respect to FIG. 8).

In particular, as the request 1301 may comprise a shopping request, the intermediation server 120 may search for the provider objects 1351 by one or more of: searching one or more of the provider systems 104 and the flight object cache 123 for flight objects 651 that meets criteria of the request 1301; and searching the ancillary object cache 124 for ancillary objects 641 associated with the flight objects received, as described above with respect to the method 400.

Furthermore, the intermediation server 120 may receive the provider objects 1351 by one or more of: receiving one or more of flight objects and the ancillary objects; and assembling one or more of the flight objects and the ancillary objects into the provider objects 1351 for categorization.

In other examples, the intermediation server 12 may assemble the flight objects and the ancillary objects based on the provider object categorization criteria 224. For example, the intermediation server 120 may assemble the flight objects and the ancillary objects, as described above. As such the number of flight objects and the ancillary objects assembled into provider objects and/or the number of provider objects assembled may be limited by assembling provider objects to meet and/or best meet and/or at least partially meet the provider object categorization criteria 224.

When the request 1301 comprises a pricing request however, the intermediation server 120 may search the provider system 104 for flight objects and ancillary objects, as described above. The intermediation server 120 may receive the provider objects 1351 by one or more of receiving one or more of flight objects and a service list from the provider system 104; and assembling one or more of the flight objects and the ancillary objects defined by the service list into the provider objects 1351 for categorization.

Hence, while FIG. 13 does not distinguish between flight objects and ancillary objects, it is understood that provider objects 1351 may be assembled to include at least one flight object and/or be assembled with a flight object. For example, the provider objects 1351 from the ancillary object cache 124 comprise ancillary objects 641 which may be assembled with a flight object at the intermediation server 120.

It is further understood that provider objects 1351 received from the flight object cache 123 comprise the flight objects 651.

In any event, the intermediation server 120 receives one or more provider objects 1351 which may be categorized according to the depicted provider object categorization criteria 224 (e.g. provider object categorization criteria 224-1, 224-2, 224-3) which may be associated with the client device 112 (and/or the given entity and/or company such as "ABC INC.").

For example, attention is next directed to FIG. 14 which depicts examples of the provider objects 1351 and the provider object categorization criteria 224.

As depicted, the provider objects 1351 are depicted in tabular form for simplicity, and arranged by airlines in rows (e.g. airlines "AL1", "AL2", "AL3") and provider objects 1351 in columns; the depicted provider objects 1351 correspond to base offers (e.g. a lowest fare that an airline may offer), first upsell offers and second upsell offers (e.g. the upsell offers may include more and/or different ancillary services than the base offer). In other words, as depicted, in response to the request 1301, the provider objects 1351 have been received which represent flights that meet the criteria of the request 1301, with the airline AL1 being associated with three provider objects 1351, the airline AL2 being associated with one provider object 1351, and the airline AL2 being associated with three provider objects 1351. While prices and flight details of the provider objects 1351 are not depicted, they are nonetheless understood to be present; rather, the provider objects 1351, as depicted in FIG. 14, show fare conditions and/or rules (e.g. whether a flight is refundable or not and/or conditions for a refund and/or changing a flight), and ancillary services included with a provider object 1351. For example, as depicted, each provider object 1351 shows whether carryon bags, checked bags and a premium seat are included.

Further, each provider object 1351 shows a "Fare Family" or "FF" that an associated airline uses to categorize and/or classify a provider object 1351. For example, the airline "AL1" includes three fare families, "Basic", "Good" and "Maxi" (e.g. one base offer and two upsell offers); the airline "AL2" includes one fare family, "Standard" (e.g. one base offer and no upsell offers); and the airline "AL3" includes three fare families, "Super Eco", "Eco" and "Eco Plus" (e.g. one base offer and two upsell offers).

Also depicted in FIG. 14 are the provider object categorization criteria 224 in a table 1424 tabular form for simplicity, and arranged in columns, with a set of provider object categorization criteria 224 per column. For example the first column of the table 1424 shows provider object categorization criteria 224-1, the second column of the table 1424 shows provider object categorization criteria 224-2 and the third column of the table 1424 shows the provider object categorization criteria 224-3.

The second row of the table 1424 shows specific ancillary services and fare conditions and/or rules of the provider object categorization criteria 224 for a given column. For example, the provider object categorization criteria 224-1 includes no carryon bags, no checked bags, no premium seats, and non-refundable flight tickets. Similarly, the provider object categorization criteria 224-2 includes one carryon bag, no checked bags, no premium seats, and changing a flight for a fee. Similarly, the provider object categorization criteria 224-3 includes one carryon bag, one checked bag, a premium seat, and completely refundable flight tickets.

The table 1424 further shows, in remaining rows, categorization of the provider objects 1351 according to respective provider object categorization criteria 224 for a given column, as well as a ranking thereof, as determined by the intermediation server 120 (e.g. at the block 508 of the method 500).

For example, as depicted, the intermediation server 120 has determined that the provider object 1351 of the airline "AL1" and fare family "Basic" match criteria of the provider object categorization criteria 224-1. The intermediation server 120 has determined that the provider object 1351 of the airline "AL2" and fare family "Standard" partially matches the criteria of the provider object categorization criteria 224-1, and similarly that the provider object 1351 of the airline "AL3" and fare family "Super Eco" partially matches the criteria of the provider object categorization criteria 224-1.

As depicted, the intermediation server 120 has further ranked the provider objects 1351 that match and/or partially match the criteria of the provider object categorization criteria 224-1. For example, the provider object 1351 of the airline "AL1" and fare family "Basic" is highest ranked as the match is 100%, whereas the other provider objects 1351 are lower ranked as the match is partial.

The ranking may further occur in any suitable manner; for example lower cost provider objects 1351 that have a same number of criteria matches as higher cost provider object 1351 may be ranked higher than such higher cost provider objects 1351. Alternatively, certain criteria, such as a premium seat, may be given a higher weight than other criteria, such as checked bags; for example, even though the provider object categorization criteria 224-1 specifies no checked bags, the provider object 1351 of the airline "AL2" and fare family "Standard" may be given a higher weight (e.g. than the provider object 1351 of the airline "AL3" and fare family "Super Eco") as it includes a checked bag. However, any suitable criteria may be used to categorize and rank the provider objects 1351.

Furthermore, some provider objects 1351 may be categorized according to different provider object categorization criteria 224. For example, the provider object 1351 of the airline "AL3" and fare family "Super Eco" is categorized according to both the provider object categorization criteria 224-1, 224-2, though the provider object 1351 of the airline "AL3" and fare family "Super Eco" is higher ranked against the provider object categorization criteria 224-2.

Furthermore, some provider objects 1351 may include flight objects combined with ancillary objects. For example, as depicted in the second column of the table 1424, a provider object 1351 that includes the provider object 1351 of the airline "AL1" and fare family "Basic" is combined with an ancillary object 641 from the ancillary object cache 124, for example to add a carryon bag thereto. Similarly, depicted in the third column of the table 1424, a provider object 1351 includes the provider object 1351 of the airline "AL2" and fare family "Standard" is combined with two ancillary objects 641 from the ancillary object cache 124, for example to add a carryon bag and a checked bag thereto.

Figure 15:
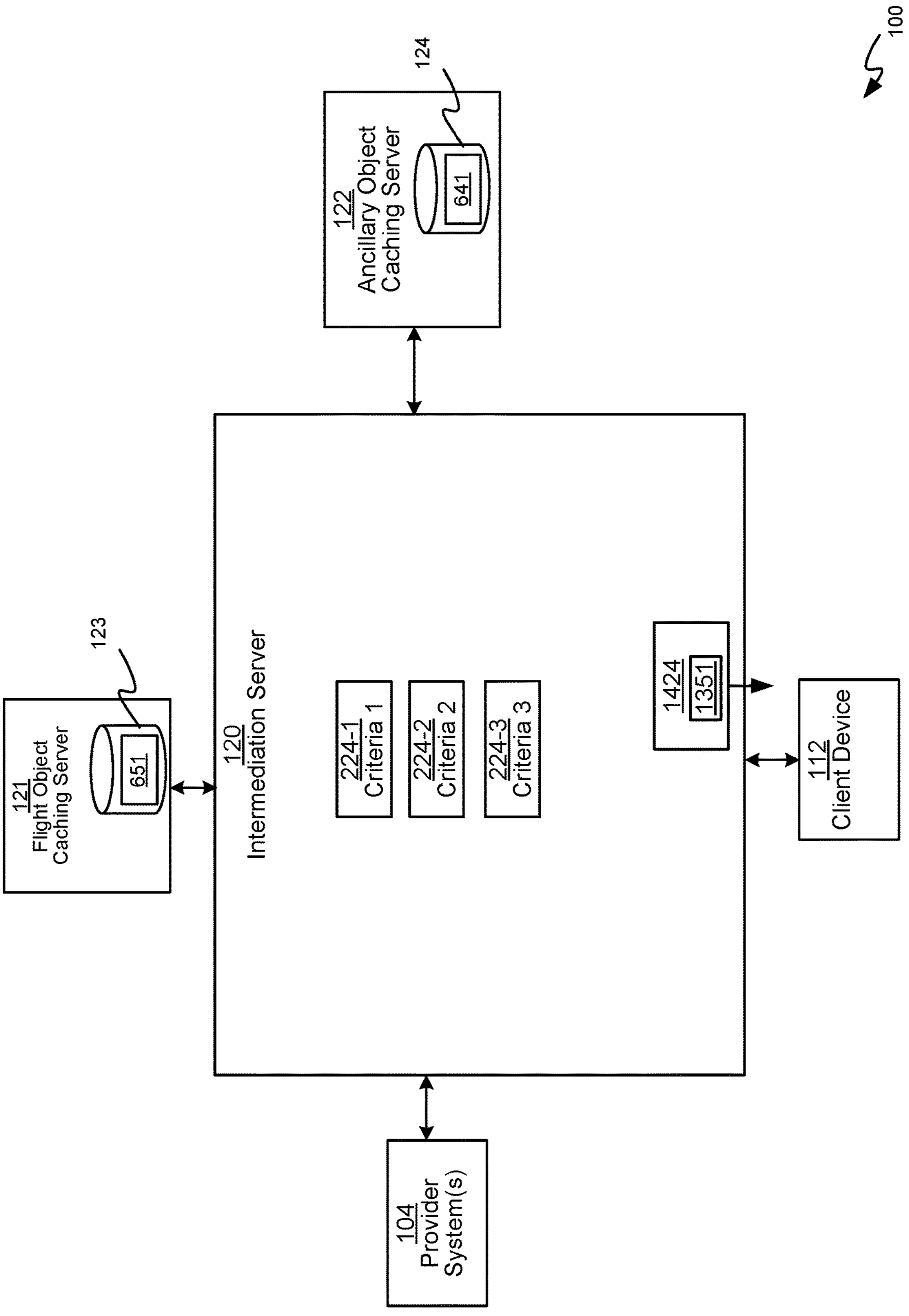
FIG. 15 depicts the intermediation server of the system of FIG. 1 providing provider objects, as categorized and ranked by the provider object categorization criteria, to a client device, according to non-limiting examples.

In any event, as depicted in FIG. 15, the provider objects 1351 may be provided (e.g. at the block 510 of the method 500) to the client device 112, as categorized and ranked by the provider object categorization criteria 224, for example in the table 1424, though the provider objects 1351 may be provided to the client device 112, as categorized, etc., in any suitable format.

The provider objects 1351 may be rendered at a display screen of the client device 112, as categorized, for selection and/or purchase, similar to as described above. Alternatively, the provider objects 1351 as categorized may be provided by the entity (e.g. a travel agent) to the business that has defined the provider object categorization criteria 224 such that a provider object 1351 may be selected for purchase that aligns with an employee's position in organization hierarchy.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A server comprising:

communication interface; and a controller configured to:

receive, via the communication interface, a flight object representing a flight provided by one or more provider systems;

search an ancillary object cache for predetermined ancillary objects associated with previous flights similar to the flight; and when one or more of the predetermined ancillary objects, associated with at least one previous flight similar to the flight, are found at the ancillary object cache, provide, via the communication interface, to a requesting device, a response corresponding to the flight object and the one or more of the predetermined ancillary objects associated with the at least one previous flight similar to the flight;

when the one or more of the predetermined ancillary objects are not found at the ancillary object cache, determine a mode for a request, wherein the request includes an indication of the mode, and wherein the controller is further configured to, when the one or more of the predetermined ancillary objects are not found at the ancillary object cache, in a determined first mode:

request further ancillary objects from the one or more provider systems, the further ancillary objects associated with the flight;

provide the response to the requesting device, the response corresponding to the flight object and the further ancillary objects as received from the one or more provider systems, in place of the one or more of the predetermined ancillary objects; and store the further ancillary objects, as received from the one or more provider systems, at the ancillary object cache as further predetermined ancillary objects;

wherein the controller is further configured to, when the one or more of the predetermined ancillary objects are not found at the ancillary object cache, in a determined second mode:

provide the response to the requesting device, the response corresponding to the flight object, the response provided without an ancillary object;

request respective further ancillary objects from the one or more provider systems, the respective further ancillary objects associated with the flight; and store the respective further ancillary objects, as received from the one or more provider systems, at the ancillary object cache as respective further predetermined ancillary objects.

2. The server of claim 1, wherein the controller is further configured to:

receive, from the requesting device, the request for the flight object;

search, based on criteria of the request, at least one of a flight object cache and the one or more provider systems for the flight object; and receive, from at least one of the flight object cache and the one or more provider systems, the flight object.

3. The server of claim 1, wherein the controller is further configured to:

receive the predetermined ancillary objects;

categorize the predetermined ancillary objects based on one or more of type and previous flight associations; and store, at the ancillary object cache, the predetermined ancillary objects as categorized.

4. The server of claim 1, wherein the flight object and the one or more predetermined ancillary objects comprise New Distribution Capability (NDC) offers.

5. A method comprising:

receiving, at one or more servers, from a requesting device, a flight object representing a flight provided by one or more provider systems;

searching, at the one or more servers, an ancillary object cache for predetermined ancillary objects associated with previous flights similar to the flight;

when one or more of the predetermined ancillary objects, associated with at least one previous flight similar to the flight, are found at the ancillary object cache, providing, via the one or more servers, to a requesting device, a response corresponding to the flight object and the one or more of the predetermined ancillary objects associated with the at least one previous flight similar to the flight;

when the one or more of the predetermined ancillary objects are not found at the ancillary object cache, determining, via the one or more servers, a mode for a request, wherein the request includes an indication of the mode and wherein the method further comprises, via the one or more servers, when the one or more of the predetermined ancillary objects are not found at the ancillary object cache, in a determined first mode:

requesting, via the one or more servers, further ancillary objects from the one or more provider systems, the further ancillary objects associated with the flight;

providing the response to the requesting device, the response corresponding to the flight object and the further ancillary objects as received from the one or more provider systems, in place of the one or more of the predetermined ancillary objects; and storing, via the one or more servers, the further ancillary objects, as received from the one or more provider systems, at the ancillary object cache as further predetermined ancillary objects;

wherein the method further comprises, via the one or more servers, when the one or more of the predetermined ancillary objects are not found at the ancillary object cache, in a determined second mode:

providing, via the one or more servers, the response to the requesting device, the response corresponding to the flight object, the response provided without an ancillary object;

requesting, via the one or more servers, respective further ancillary objects from the one or more provider systems, the respective further ancillary objects associated with the flight; and storing, via the one or more servers, the respective further ancillary objects, as received from the one or more provider systems, at the ancillary object cache as respective further predetermined ancillary objects.

6. The method of claim 5, further comprising:

receiving, at one or more servers, from the requesting device, the request, the request being for one or more provider objects provided by the one or more provider systems;

searching, at the one or more servers, for the one or more provider objects at one or more of the provider systems, a flight object cache and the ancillary object cache;

receiving, at the one or more servers, the one or more provider objects;

categorizing, at the one or more servers, the one or more provider objects based on provider object categorization criteria associated with the requesting device; and storing, at the ancillary object cache, a classified response.

7. The method of claim 6, wherein the provider object categorization criteria comprises respective prepopulated definitions of one or more of respective service levels of flights, associated fare rules, and associated services of the flights, the prepopulated definitions associated with the requesting device and not the one or more provider systems.

8. The method of claim 6, further comprising, when the request comprises a shopping request:

searching for the one or more provider objects by one or more of: searching one or more of the provider systems and the flight object cache for flight objects that meets criteria of the request; and searching the ancillary object cache for ancillary objects associated with the flight objects; and receiving the one or more provider objects by one or more of: receiving one or more of the flight objects; assembling one or more of the flight objects and ancillary objects into the one or more provider objects for categorization; and assembling one or more of the flight objects and the ancillary objects into the provider objects based on the provider object categorization criteria.

9. The method of claim 6, further comprising, when the request comprises a pricing request:

searching for the one or more provider objects by one or more of: searching one or more of the provider systems for flight objects that meets criteria of the request; and requesting, from the one or more provider systems, a service list defining ancillary objects associated with the flight objects; and receiving the one or more provider objects by one or more of: receiving one or more of the flight objects and the service list; assembling one or more of the flight objects and ancillary objects defined by the service list into the one or more provider objects for categorization; and assembling one or more of the flight objects and the ancillary objects into the one or more provider objects based on the provider object categorization criteria.

10. The method of claim 5, wherein the one or more provider objects comprise New Distribution Capability (NDC) offers.

11. The method of claim 6, further comprising:

ranking the one or more provider objects, as categorized, based on the provider object categorization criteria, wherein the response corresponds to the one or more provider objects as categorized and ranked.

12. A non-transitory computer-readable medium storing a computer program, wherein execution of the computer program is for:

receiving, at one or more servers, from a requesting device, a flight object representing a flight provided by one or more provider systems;

searching, at the one or more servers, an ancillary object cache for predetermined ancillary objects associated with previous flights similar to the flight;

when one or more of the predetermined ancillary objects, associated with at least one previous flight similar to the flight, are found at the ancillary object cache, providing, via the one or more servers, to a requesting device, a response corresponding to the flight object and the one or more of the predetermined ancillary objects associated with the at least one previous flight similar to the flight;

when the one or more of the predetermined ancillary objects are not found at the ancillary object cache, determining, via the one or more servers, a mode for a request, wherein the request includes an indication of the mode and, via the one or more servers, when the one or more of the predetermined ancillary objects are not found at the ancillary object cache, in a determined first mode:

requesting, via the one or more servers, further ancillary objects from the one or more provider systems, the further ancillary objects associated with the flight;

providing the response to the requesting device, the response corresponding to the flight object and the further ancillary objects as received from the one or more provider systems, in place of the one or more of the predetermined ancillary objects; and storing, via the one or more servers, the further ancillary objects, as received from the one or more provider systems, at the ancillary object cache as further predetermined ancillary objects;

wherein, via the one or more servers, when the one or more of the predetermined ancillary objects are not found at the ancillary object cache, in a determined second mode:

providing, via the one or more servers, the response to the requesting device, the response corresponding to the flight object, the response provided without an ancillary object;

requesting, via the one or more servers, respective further ancillary objects from the one or more provider systems, the respective further ancillary objects associated with the flight; and storing, via the one or more servers, the respective further ancillary objects, as received from the one or more provider systems, at the ancillary object cache as respective further predetermined ancillary objects.

13. The non-transitory computer-readable medium of claim 12, wherein execution of the computer program is further for:

receiving, from the requesting device, the request for the flight object;

searching, based on criteria of the request, at least one of a flight object cache and the one or more provider systems for the flight object; and receiving, from at least one of the flight object cache and the one or more provider systems, the flight object.

14. The non-transitory computer-readable medium of claim 12, wherein execution of the computer program is further for:

receiving the predetermined ancillary objects;

categorizing the predetermined ancillary objects based on one or more of type and previous flight associations; and storing, at the ancillary object cache, the predetermined ancillary objects as categorized.

15. The non-transitory computer-readable medium of claim 12, wherein the flight object and the one or more predetermined ancillary objects comprise New Distribution Capability (NDC) offers.

* * * * *